United States Patent
McGavran et al.

(10) Patent No.: US 9,574,896 B2
(45) Date of Patent: Feb. 21, 2017

(54) NAVIGATION USER INTERFACE

(71) Applicant: Apple Inc., Cupertino, CA (US)

(72) Inventors: Christine McGavran, Pacifica, CA (US); Joshua Weinberg, Mountain View, CA (US); Marcel Van Os, San Francisco, CA (US); Hugo Verweij, San Francisco, CA (US); Jefferey Meininger, San Francisco, CA (US); Eric L. Grundstrom, Oakland, CA (US); Usama M. Hajj, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/864,011

(22) Filed: Sep. 24, 2015

(65) Prior Publication Data
US 2016/0238402 A1 Aug. 18, 2016

Related U.S. Application Data

(60) Provisional application No. 62/116,272, filed on Feb. 13, 2015.

(51) Int. Cl.
*G01C 21/00* (2006.01)
*G01C 21/36* (2006.01)

(52) U.S. Cl.
CPC ..... *G01C 21/3626* (2013.01); *G01C 21/3629* (2013.01); *G01C 21/3652* (2013.01); *G01C 21/3655* (2013.01); *G01C 21/3661* (2013.01)

(58) Field of Classification Search
CPC ............ G01C 21/3626; G01C 21/3629; G01C 21/3652; G01C 21/3661
USPC .......................................... 701/538, 537, 491
See application file for complete search history.

(56) References Cited

U.S. PATENT DOCUMENTS

| | | | |
|---|---|---|---|
| 4,803,487 A | 2/1989 | Willard et al. | |
| 5,617,031 A | 4/1997 | Tuttle | |
| 5,853,327 A | 12/1998 | Gilboa | |
| 5,917,913 A | 6/1999 | Wang | |

(Continued)

FOREIGN PATENT DOCUMENTS

| | | |
|---|---|---|
| AU | 2015100708 A4 | 7/2015 |
| AU | 2015100709 A4 | 7/2015 |

(Continued)

OTHER PUBLICATIONS

Final Office Action received for U.S. Appl. No. 14/503,072, mailed on Sep. 1, 2015, 16 pages.

(Continued)

*Primary Examiner* — Marthe Marc-Coleman
(74) *Attorney, Agent, or Firm* — Morrison & Foerster LLP

(57) ABSTRACT

The present disclosure relates to techniques for managing navigation alerts. The disclosure generally describes an exemplary technique whereby a first device, such as a smartphone, coordinates the timing or sequence of alerts for a navigation instruction on the first device and on a second device, such as a smartwatch. In some examples, the second device presents an alert to a user indicating an event condition has been met before the first device presents a different alert to the user indicating that the same event condition has been met. The alert at the second device allows the user to anticipate the alert at the first device.

42 Claims, 17 Drawing Sheets

(56) References Cited

U.S. PATENT DOCUMENTS

| | | | |
|---|---|---|---|
| 6,167,353 A | 12/2000 | Piernot et al. | |
| 6,190,174 B1 | 2/2001 | Lam | |
| 6,282,656 B1 | 8/2001 | Wang | |
| 6,323,846 B1 | 11/2001 | Westerman et al. | |
| 6,398,646 B1 | 6/2002 | Wei et al. | |
| 6,570,557 B1 | 5/2003 | Westerman et al. | |
| 6,677,932 B1 | 1/2004 | Westerman | |
| 6,889,138 B1 | 5/2005 | Krull et al. | |
| 7,081,905 B1 | 7/2006 | Raghunath | |
| 7,130,664 B1 | 10/2006 | Williams | |
| 7,305,350 B1 | 12/2007 | Bruecken | |
| 7,347,361 B2 | 3/2008 | Lovett | |
| 7,614,008 B2 | 11/2009 | Ording | |
| 7,633,076 B2 | 12/2009 | Huppi et al. | |
| 7,644,019 B2 | 1/2010 | Woda et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,810,720 B2 | 10/2010 | Lovett | |
| 7,843,471 B2 | 11/2010 | Doan et al. | |
| 7,844,914 B2 | 11/2010 | Andre et al. | |
| 7,957,762 B2 | 6/2011 | Herz et al. | |
| RE42,574 E | 7/2011 | Cockayne | |
| 8,006,002 B2 | 8/2011 | Kalayjian et al. | |
| 8,050,997 B1 | 11/2011 | Nosek et al. | |
| 8,195,576 B1 | 6/2012 | Grigg et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,392,259 B2 | 3/2013 | MacGillivray et al. | |
| 8,479,122 B2 | 7/2013 | Hotelling et al. | |
| 8,571,937 B2 | 10/2013 | Rose et al. | |
| 8,763,896 B2 | 7/2014 | Kushevsky et al. | |
| 8,880,055 B1 | 11/2014 | Clement et al. | |
| 8,892,474 B1 | 11/2014 | Inskeep et al. | |
| 8,894,462 B2 | 11/2014 | Leyland et al. | |
| 9,355,393 B2 | 5/2016 | Purves et al. | |
| 2002/0015024 A1 | 2/2002 | Westerman et al. | |
| 2002/0023215 A1 | 2/2002 | Wang et al. | |
| 2002/0087262 A1 | 7/2002 | Bullock et al. | |
| 2003/0171984 A1 | 9/2003 | Wodka et al. | |
| 2003/0181201 A1 | 9/2003 | Bomze et al. | |
| 2004/0044953 A1 | 3/2004 | Watkins et al. | |
| 2004/0100389 A1 | 5/2004 | Naito et al. | |
| 2004/0169722 A1 | 9/2004 | Pena | |
| 2004/0254891 A1 | 12/2004 | Blinn et al. | |
| 2005/0187873 A1 | 8/2005 | Labrou et al. | |
| 2005/0190059 A1 | 9/2005 | Wehrenberg | |
| 2005/0191159 A1 | 9/2005 | Benko | |
| 2005/0237194 A1 | 10/2005 | VoBa | |
| 2006/0017692 A1 | 1/2006 | Wehrenberg et al. | |
| 2006/0025923 A1 | 2/2006 | Dotan et al. | |
| 2006/0026536 A1 | 2/2006 | Hotelling et al. | |
| 2006/0033724 A1 | 2/2006 | Chaudhri et al. | |
| 2006/0079973 A1 | 4/2006 | Bacharach | |
| 2006/0135064 A1 | 6/2006 | Cho et al. | |
| 2006/0165060 A1 | 7/2006 | Dua | |
| 2006/0197753 A1 | 9/2006 | Hotelling | |
| 2006/0294025 A1 | 12/2006 | Mengerink | |
| 2007/0096283 A1 | 5/2007 | Ljung et al. | |
| 2007/0131759 A1 | 6/2007 | Cox et al. | |
| 2007/0188409 A1 | 8/2007 | Repetto et al. | |
| 2007/0260558 A1 | 11/2007 | Look | |
| 2008/0016443 A1 | 1/2008 | Hiroshima et al. | |
| 2008/0027947 A1 | 1/2008 | Pritchett et al. | |
| 2008/0040786 A1 | 2/2008 | Chang | |
| 2008/0041936 A1 | 2/2008 | Vawter | |
| 2008/0077673 A1 | 3/2008 | Thomas | |
| 2008/0120707 A1 | 5/2008 | Ramia | |
| 2008/0214191 A1 | 9/2008 | Yach et al. | |
| 2008/0320391 A1 | 12/2008 | Lemay et al. | |
| 2009/0036165 A1 | 2/2009 | Brede | |
| 2009/0037326 A1 | 2/2009 | Chitti et al. | |
| 2009/0083850 A1 | 3/2009 | Fadell et al. | |
| 2009/0088207 A1 | 4/2009 | Sweeney et al. | |
| 2009/0182674 A1 | 7/2009 | Patel et al. | |
| 2009/0195402 A1 | 8/2009 | Izadi et al. | |
| 2009/0195469 A1 | 8/2009 | Lim et al. | |
| 2009/0199130 A1 | 8/2009 | Tsern et al. | |
| 2009/0203315 A1 | 8/2009 | Kawabata et al. | |
| 2009/0210308 A1 | 8/2009 | Toomer et al. | |
| 2009/0222748 A1 | 9/2009 | Lejeune et al. | |
| 2009/0325630 A1 | 12/2009 | Tiitola et al. | |
| 2010/0023449 A1 | 1/2010 | Skowronek et al. | |
| 2010/0026453 A1 | 2/2010 | Yamamoto et al. | |
| 2010/0082481 A1 | 4/2010 | Lin et al. | |
| 2010/0114731 A1 | 5/2010 | Kingston et al. | |
| 2010/0131190 A1 | 5/2010 | Terauchi et al. | |
| 2010/0149090 A1 | 6/2010 | Morris et al. | |
| 2010/0153265 A1 | 6/2010 | Hershfield et al. | |
| 2010/0161434 A1 | 6/2010 | Herwig et al. | |
| 2010/0164864 A1 | 7/2010 | Chou | |
| 2010/0185446 A1 | 7/2010 | Homma et al. | |
| 2010/0223145 A1 | 9/2010 | Dragt | |
| 2010/0267362 A1 | 10/2010 | Smith et al. | |
| 2010/0287513 A1 | 11/2010 | Singh et al. | |
| 2010/0306107 A1 | 12/2010 | Nahari | |
| 2011/0059769 A1 | 3/2011 | Brunolli | |
| 2011/0081860 A1 | 4/2011 | Brown et al. | |
| 2011/0099079 A1 | 4/2011 | White | |
| 2011/0159959 A1 | 6/2011 | Mallinson et al. | |
| 2011/0184820 A1 | 7/2011 | Mon et al. | |
| 2011/0225057 A1 | 9/2011 | Webb et al. | |
| 2011/0251892 A1 | 10/2011 | Laracey | |
| 2012/0028609 A1 | 2/2012 | Hruska | |
| 2012/0036556 A1 | 2/2012 | LeBeau et al. | |
| 2012/0078751 A1 | 3/2012 | MacPhail et al. | |
| 2012/0089300 A1* | 4/2012 | Wolterman | B60Q 1/34 707/36 |
| 2012/0089507 A1 | 4/2012 | Zhang et al. | |
| 2012/0116669 A1 | 5/2012 | Lee et al. | |
| 2012/0123937 A1 | 5/2012 | Spodak | |
| 2012/0185397 A1 | 7/2012 | Levovitz et al. | |
| 2012/0192094 A1 | 7/2012 | Goertz | |
| 2012/0197740 A1 | 8/2012 | Grigg et al. | |
| 2012/0198531 A1 | 8/2012 | Ort et al. | |
| 2012/0215647 A1 | 8/2012 | Powell et al. | |
| 2012/0236037 A1 | 9/2012 | Lessing et al. | |
| 2012/0245985 A1 | 9/2012 | Cho et al. | |
| 2012/0287290 A1 | 11/2012 | Jain | |
| 2012/0290449 A1 | 11/2012 | Mullen et al. | |
| 2012/0303268 A1 | 11/2012 | Su et al. | |
| 2012/0310760 A1 | 12/2012 | Phillips et al. | |
| 2012/0316777 A1 | 12/2012 | Kitta | |
| 2012/0322370 A1 | 12/2012 | Lee | |
| 2012/0322371 A1 | 12/2012 | Lee | |
| 2013/0006746 A1 | 1/2013 | Moore | |
| 2013/0047034 A1 | 2/2013 | Salomon et al. | |
| 2013/0065482 A1 | 3/2013 | Trickett | |
| 2013/0076591 A1 | 3/2013 | Sirpal et al. | |
| 2013/0085931 A1 | 4/2013 | Runyan | |
| 2013/0103519 A1 | 4/2013 | Kountotsis et al. | |
| 2013/0106603 A1 | 5/2013 | Weast et al. | |
| 2013/0110719 A1 | 5/2013 | Carter et al. | |
| 2013/0134212 A1 | 5/2013 | Chang | |
| 2013/0141325 A1 | 6/2013 | Bailey | |
| 2013/0166679 A1 | 6/2013 | Kuwahara et al. | |
| 2013/0179304 A1 | 7/2013 | Swist | |
| 2013/0189953 A1 | 7/2013 | Mathews | |
| 2013/0200146 A1 | 8/2013 | Moghadam | |
| 2013/0218721 A1 | 8/2013 | Borhan et al. | |
| 2013/0219285 A1 | 8/2013 | Iwasaki | |
| 2013/0232073 A1 | 9/2013 | Sheets et al. | |
| 2013/0244615 A1 | 9/2013 | Miller | |
| 2013/0246202 A1 | 9/2013 | Tobin | |
| 2013/0282533 A1 | 10/2013 | Foran-Owens et al. | |
| 2013/0304651 A1 | 11/2013 | Smith | |
| 2013/0332358 A1 | 12/2013 | Zhao | |
| 2013/0332364 A1 | 12/2013 | Templeton et al. | |
| 2013/0339436 A1 | 12/2013 | Gray | |
| 2013/0345975 A1 | 12/2013 | Vulcano et al. | |
| 2013/0346882 A1 | 12/2013 | Shiplacoff et al. | |
| 2014/0006285 A1 | 1/2014 | Chi et al. | |
| 2014/0006949 A1 | 1/2014 | Briand et al. | |

(56) References Cited

U.S. PATENT DOCUMENTS

| | | |
|---|---|---|
| 2014/0015546 A1 | 1/2014 | Frederick |
| 2014/0025520 A1 | 1/2014 | Mardikar et al. |
| 2014/0058935 A1 | 2/2014 | Mijares |
| 2014/0058941 A1 | 2/2014 | Moon et al. |
| 2014/0068751 A1 | 3/2014 | Last |
| 2014/0073252 A1 | 3/2014 | Lee et al. |
| 2014/0074716 A1 | 3/2014 | Ni |
| 2014/0081854 A1 | 3/2014 | Sanchez et al. |
| 2014/0084857 A1 | 3/2014 | Liu et al. |
| 2014/0094124 A1 | 4/2014 | Dave et al. |
| 2014/0099886 A1 | 4/2014 | Monroe |
| 2014/0101056 A1 | 4/2014 | Wendling |
| 2014/0122331 A1 | 5/2014 | Vaish et al. |
| 2014/0129441 A1 | 5/2014 | Blanco et al. |
| 2014/0134947 A1 | 5/2014 | Stouder-Studenmund |
| 2014/0140587 A1 | 5/2014 | Ballard et al. |
| 2014/0142851 A1 | 5/2014 | Larmo et al. |
| 2014/0143145 A1 | 5/2014 | Kortina et al. |
| 2014/0143737 A1 | 5/2014 | Mistry et al. |
| 2014/0155031 A1 | 6/2014 | Lee et al. |
| 2014/0167986 A1* | 6/2014 | Parada ............... G01C 21/365 340/905 |
| 2014/0180582 A1 | 6/2014 | Pontarelli et al. |
| 2014/0188673 A1 | 7/2014 | Graham et al. |
| 2014/0191715 A1 | 7/2014 | Wechlin et al. |
| 2014/0197234 A1 | 7/2014 | Hammad |
| 2014/0237389 A1 | 8/2014 | Ryall et al. |
| 2014/0279442 A1 | 9/2014 | Luoma et al. |
| 2014/0279556 A1 | 9/2014 | Priebatsch et al. |
| 2014/0282987 A1 | 9/2014 | Narendra et al. |
| 2014/0337207 A1 | 11/2014 | Zhang et al. |
| 2014/0337450 A1 | 11/2014 | Choudhary et al. |
| 2014/0343843 A1* | 11/2014 | Yanku ................. G01C 21/26 701/491 |
| 2014/0344082 A1 | 11/2014 | Soundararajan |
| 2014/0365113 A1 | 12/2014 | McGavran et al. |
| 2014/0370807 A1 | 12/2014 | Lei et al. |
| 2015/0012425 A1 | 1/2015 | Mathew |
| 2015/0014141 A1 | 1/2015 | Rao et al. |
| 2015/0056957 A1 | 2/2015 | Mardikar et al. |
| 2015/0061972 A1 | 3/2015 | Seo et al. |
| 2015/0065035 A1 | 3/2015 | Kim et al. |
| 2015/0066758 A1 | 3/2015 | DeNardis et al. |
| 2015/0067580 A1 | 3/2015 | Um et al. |
| 2015/0077362 A1 | 3/2015 | Seo |
| 2015/0095174 A1 | 4/2015 | Dua |
| 2015/0127539 A1 | 5/2015 | Ye et al. |
| 2015/0257004 A1 | 9/2015 | Shanmugam et al. |
| 2015/0348001 A1 | 12/2015 | Van Os et al. |
| 2015/0348002 A1 | 12/2015 | Van Os et al. |
| 2015/0348014 A1 | 12/2015 | Van Os et al. |
| 2015/0348029 A1 | 12/2015 | Van Os et al. |
| 2015/0350448 A1 | 12/2015 | Coffman et al. |
| 2016/0021003 A1 | 1/2016 | Pan |
| 2016/0048705 A1 | 2/2016 | Yang et al. |
| 2016/0061613 A1 | 3/2016 | Jung et al. |
| 2016/0061623 A1 | 3/2016 | Pahwa et al. |
| 2016/0062572 A1 | 3/2016 | Yang et al. |
| 2016/0180305 A1 | 6/2016 | Dresser et al. |
| 2016/0224966 A1 | 8/2016 | Van Os et al. |
| 2016/0224973 A1 | 8/2016 | Van Os et al. |

FOREIGN PATENT DOCUMENTS

| | | |
|---|---|---|
| CN | 104038256 A | 9/2014 |
| CN | 104205785 A | 12/2014 |
| CN | 104281430 A | 1/2015 |
| CN | 104346297 A | 2/2015 |
| EP | 0836074 A2 | 4/1998 |
| EP | 1614992 A1 | 1/2006 |
| EP | 1858238 A2 | 11/2007 |
| EP | 2096413 A1 | 9/2009 |
| EP | 2247087 A1 | 11/2010 |
| EP | 2306692 A1 | 4/2011 |
| EP | 2341315 A1 | 7/2011 |
| EP | 2428947 A2 | 3/2012 |
| EP | 2466260 A1 | 6/2012 |
| EP | 2523439 A1 | 11/2012 |
| EP | 2632131 A1 | 8/2013 |
| EP | 2654275 A1 | 10/2013 |
| EP | 2672377 A2 | 12/2013 |
| EP | 2701107 A1 | 2/2014 |
| EP | 2720442 A1 | 4/2014 |
| EP | 2725537 A1 | 4/2014 |
| GB | 2505476 A | 3/2014 |
| JP | 11-183183 A | 7/1999 |
| TW | 201137722 A | 11/2011 |
| TW | 201316247 A | 4/2013 |
| TW | 201324310 A | 6/2013 |
| TW | 201409345 A | 3/2014 |
| TW | M474482 U | 3/2014 |
| WO | 03/093765 A2 | 11/2003 |
| WO | 2007/008321 A2 | 1/2007 |
| WO | 2007/105937 A1 | 9/2007 |
| WO | 2010/039337 A2 | 4/2010 |
| WO | 2011/063516 A1 | 6/2011 |
| WO | 2012/083113 A2 | 6/2012 |
| WO | 2013/023224 A2 | 2/2013 |
| WO | 2013/169875 A2 | 11/2013 |
| WO | 2014078965 A1 | 5/2014 |
| WO | 2014/171734 A2 | 10/2014 |

OTHER PUBLICATIONS

Non Final Office Action received for U.S. Appl. No. 14/503,072, mailed on Jan. 26, 2015, 12 pages.
Final Office Action received for U.S. Appl. No. 14/503,296, mailed on Jul. 2, 2015, 7 pages.
Non Final Office Action received for U.S. Appl. No. 14/503,296, mailed on Jan. 30, 2015, 16 pages.
Non-Final Office Action received for U.S. Appl. No. 14/503,381, mailed on May 13, 2015, 13 pages.
Notice of Allowance received for the U.S. Appl. No. 14/503,381, mailed on Dec. 16, 2015, 8 pages.
Non Final Office Action received for U.S. Appl. No. 14/836,754, mailed on Nov. 17, 2015, 15 pages.
Office Action received for Australian Patent Application No. 2015100708, issued on Sep. 8, 2015, 4 pages.
Office Action received for Australian Patent Application No. 2015100709, issued on Sep. 9, 2015 (Examination Report 1), 4 pages.
Office Action received for Australian Patent Application No. 2015100709, issued on Sep. 9, 2015 (Examination Report 2), 4 pages.
Notice of Allowance received for Chinese Patent Application No. 201520357381.9, mailed on Jul. 29, 2015, 4 pages (2 pages of English Translation and 2 pages of Official Copy.)
Office Action received for Chinese Patent Application No. 201520358683.8, mailed on Sep. 2, 2015, 4 pages (2 pages of English Translation and 2 pages of Official Copy).
Kamijo, Noboru, "Next Generation Mobile System—WatchPad1.5", Available at <http://researcher.ibm.com/researcher/view_group_subpage.php?id=5617>, accessed on Jul. 4, 2015, 2 pages.
Npasqua, "Maps: ability to swipe step by step in turn-by-turn mode", 2012, Apple Support Communities, Available at: <https://discussions.apple.com/thread/4424256?start=0&tstart=0>.
International Search Report and Written Opinion received for PCT Application No. PCT/US2015/033326, mailed on Aug. 10, 2015, 13 pages.
International Search Report and Written Opinion received for PCT Patent Application No. PCT/US2015/033380, mailed on Aug. 10, 2015, 13 pages.
Invitation to Pay Additional Fees and Partial Search Report received for PCT Patent Application No. PCT/US2015/046892, mailed on Nov. 4, 2015, 5 pages.
International Search Report and Written Opinion received for PCT Patent Application No. PCT/US2015/030199, mailed on Aug. 14, 2015, 11 pages.

(56) References Cited

OTHER PUBLICATIONS

International Search Report and Written Opinion received for PCT Patent Application No. PCT/US2015/025188, mailed on Jun. 23, 2015, 11 pages.
Office Action received for Australian Patent Application No. 2016100155, mailed on May 4, 2016, 7 pages.
Office Action received for Danish Patent Application No. PA201670074, mailed on Apr. 7, 2016, 8 pages.
Final Office Action received for U.S. Appl. No. 14/869,715, mailed on Jun. 17, 2016, 35 pages.
Invitation to Pay Additional Fees received for PCT Patent Application No. PCT/US2016/033751, mailed on Jul. 22, 2016, 2 pages.
Office Action received for Australian Patent Application No. 2016100795, mailed on Aug. 12, 2016, 6 pages.
Office Action received for Taiwanese Patent Application No. 104117508, issued on Jul. 20, 2016, 19 pages (8 pages of English Translation and 11 pages of Official Copy).
Final Office Action received for U.S. Appl. No. 14/869,831, mailed on Aug. 2, 2016, 14 pages.
Non-Final Office Action received for U.S. Appl. No. 14/719,217, mailed on Jul. 28, 2016, 28 pages.
Non-Final Office Action received for U.S. Appl. No. 14/839,913, mailed on Jul. 28, 2016, 12 pages.
Notice of Allowance received for U.S. Appl. No. 14/839,913, mailed on Aug. 11, 2016, 5 pages.
Office Action received for Chinese Patent Application No. 201620101636.X, mailed on May 25, 2016, 3 pages (1 page of English Translation and 2 pages of Official Copy).
Office Action received for Danish Patent Application No. PA201670042, mailed on Jun. 23, 2016, 5 pages.
Office Action received for Chinese Patent Application No. 201620119869.2, mailed on Jun. 3, 2016, 2 pages (1 page of English Translation and 1 page of Official Copy).
Office Action received for Danish Patent Application No. PA201670074, mailed on Jun. 28, 2016, 5 pages.
Non-Final Office Action received for U.S. Appl. No. 14/503,072, mailed on Jun. 17, 2016, 19 pages.
Notice of Allowance received for U.S. Appl. No. 14/503,364, mailed on Jun. 16, 2016, 11 pages.
Office Action received for Australian Patent Application No. 2016100383, issued on Jun. 9, 2016, 2 pages.
Office Action received for Taiwanese Patent Application No. 104114953, mailed on Jun. 8, 2016, 11 pages (5 pages of English Translation and 6 pages of Official Copy).
International Search Report and Written Opinion received for PCT Patent Application No. PCT/US2016/016621, mailed on May 9, 2016, 12 pages.
International Search Report and Written Opinion received for PCT Patent Application No. PCT/US2016/015316, mailed on Mar. 8, 2016, 13 pages.
Non Final Office Action received for U.S. Appl. No. 14/869,715, mailed on Jan. 29, 2016, 62 pages.
Non Final Office Action received for U.S. Appl. No. 14/869,831, mailed on Jan. 29, 2016, 18 pages.
Office Action received for Australian Patent Application No. 2016100090, mailed on Apr. 13, 2016, 7 pages.
Office Action received for Australian Patent Application No. 2016100367, issued on May 25, 2016, 3 pages.
Office Action received for Danish Patent Application No. PA201670042, mailed on Mar. 31, 2016, 10 pages.
Non Final Office Action received for U.S. Appl. No. 14/503,364, mailed on Feb. 3, 2016, 16 pages.
Final Office Action received for U.S. Appl. No. 14/836,754, mailed on Mar. 22, 2016, 17 pages.
Non Final Office Action received for U.S. Appl. No. 14/839,913, mailed on Mar. 2, 2016, 11 pages.
Non Final Office Action received for U.S. Appl. No. 14/869,877, mailed on Jan. 29, 2016, 18 pages.
Non Final Office Action received for U.S. Appl. No. 14/870,793, mailed on Apr. 19, 2016, 17 pages.
Notice of Allowance received for Chinese Patent Application No. 201520358683.8, issued on Mar. 10, 2016, 5 pages (3 pages of English Translation and 2 pages of Official Copy).
Office Action received for German Patent Application No. 2020150042678, mailed on Nov. 4, 2015, 5 pages (3 pages of English Translation and 2 pages of Official Copy).
EASYVIDEOGUIDES, "Mapquest", available on: https://www.youtube.com/watch?v=7sDIDNM2bCI, Dec. 26, 2007, 4 pages.
Office Action received for Danish Patent Application No. PA201570664, mailed on Mar. 15, 2016, 10 pages.
Office Action received for Danish Patent Application No. PA201570665, mailed on Mar. 31, 2016, 9 pages.
Office Action received for Danish Patent Application No. PA201570771, mailed on Mar. 17, 2016, 8 pages.
Office Action Received for Danish Patent Application No. PA201570773, mailed on Mar. 18, 2016, 9 pages.
International Search Report and Written Opinion received for PCT Application No. PCT/US2015/046892, mailed on Jan. 27, 2016, 20 pages.
International Search Report and Written Opinion received for PCT Application No. PCT/US2015/047507, mailed on Feb. 22, 2016, 22 pages.
Invitation to Pay Additional Fees received for PCT Patent Application No. PCT/US2015/047507, mailed on Jan. 4, 2016, 8 pages.
International Search Report and Written Opinion received for PCT Patent Application No. PCT/US2015/055165, mailed on Apr. 20, 2016, 22 pages.
Invitation to Pay Additional Fees received for PCT Patent Application No. PCT/US2015/055165, mailed on Jan. 18, 2016, 6 pages.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Office Action received for Danish Patent Application No. PA201570664, mailed on Jun. 3, 2016, 3 pages.
Advisory Action received for U.S. Appl. No. 14/503,296, mailed on Oct. 2, 2015, 3 pages.

* cited by examiner

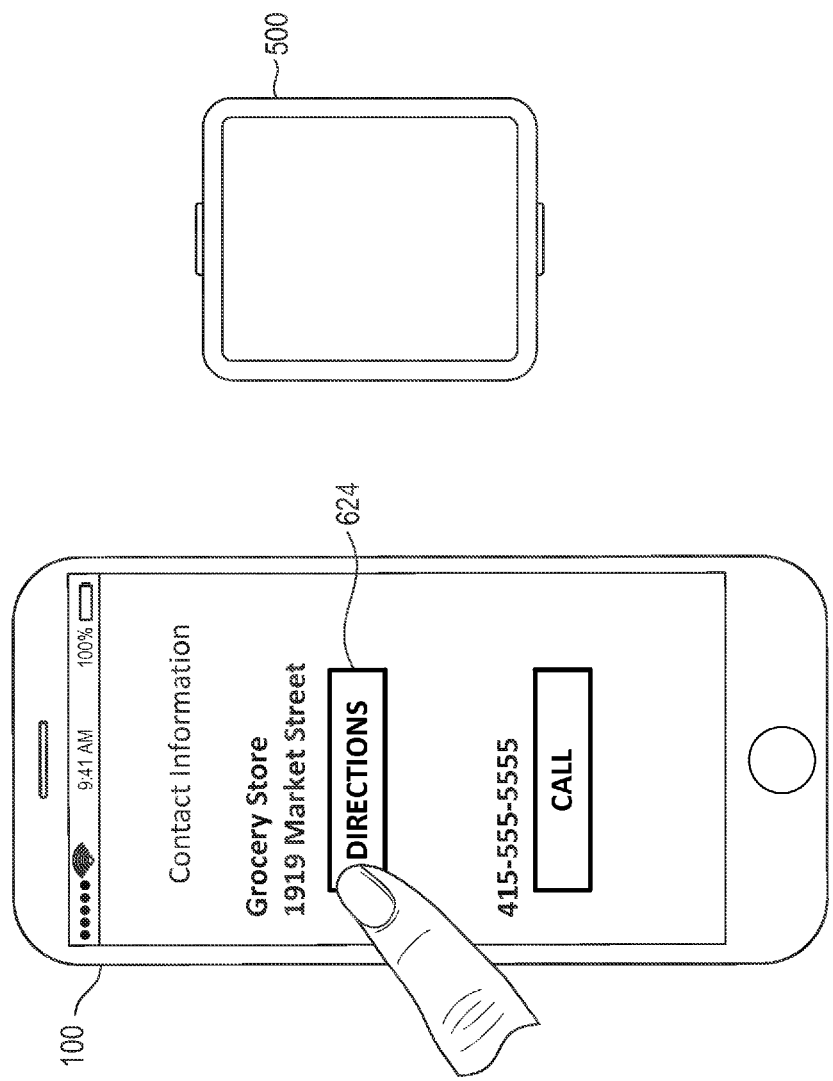

NAVIGATION USER INTERFACE

CROSS-REFERENCE TO RELATED APPLICATIONS

This application claims priority from U.S. Provisional Ser. No. 62/116,272, entitled "NAVIGATION USER INTERFACE," filed Feb. 13, 2015, which is hereby incorporated by reference in its entirety for all purposes.

This application relates to U.S. Patent Application Ser. No. 62/044,937, entitled "COMMUNICATING MAPPING APPLICATION DATA BETWEEN ELECTRONIC DEVICES", filed Sep. 2, 2014 (Reference No. P24336USP1), which is hereby incorporated by reference in its entirety.

FIELD

The present disclosure relates generally to computer user interfaces, and more specifically to techniques for managing navigation alerts.

BACKGROUND

The use of an electronic device for turn-by-turn navigation route directions has increased significantly in recent years. The electronic device provides the user with turn-by-turn instructions as the user proceeds along the route. For example, the electronic device may indicate an instruction for the user to make a turn on the display. Alternatively, the electronic device may indicate an instruction for the user to make a turn using audio.

BRIEF SUMMARY

Some techniques for managing navigation alerts using electronic devices, however, are generally cumbersome and inefficient. For example, existing techniques use a complex and time-consuming user interface, which may include multiple key presses or keystrokes or may make it difficult for the user to appreciate the device's instruction. Existing techniques require more time and attention than necessary, wasting user time and device energy. This latter consideration is particularly important in battery-operated devices. For example, a user may not be prepared for an audio navigation instruction or a displayed navigation instruction when the device presents the instruction on the device to the user.

Accordingly, there is a need for electronic devices with faster, more efficient methods and interfaces for managing navigation alerts. Such methods and interfaces optionally complement or replace other methods for managing navigation alerts. Such methods and interfaces reduce the cognitive burden on a user and produce a more efficient human-machine interface. For battery-operated computing devices, such methods and interfaces conserve power and increase the time between battery charges.

In accordance with some embodiments, a method is performed at a first device. The method includes: determining that an event condition has been met; and in response to determining that the event condition has been met: transmitting, to a second device, instructions to present a first alert at the second device at a first time indicating that the event condition has been met, and presenting, at the first device at a second time, a second alert indicating that the event condition has been met; and wherein: the second device is different from the first device, the second alert is different from the first alert, and the second time is selected so as to be spaced apart from the first time by at least a predetermined delay time period.

In accordance with some embodiments, a first device comprises: one or more processors; a memory; and one or more programs, wherein the one or more programs are stored in the memory and configured to be executed by the one or more processors, the one or more programs including instructions for: determining that an event condition has been met; in response to determining that the event condition has been met: transmitting, to a second device, instructions to present a first alert at the second device at a first time indicating that the event condition has been met; and presenting, at the first device at a second time, a second alert indicating that the event condition has been met; and wherein: the second device is different from the first device, the second alert is different from the first alert, and the second time is selected so as to be spaced apart from the first time by at least a predetermined delay time period.

In accordance with some embodiments, a non-transitory computer readable storage medium stores one or more programs, the one or more programs comprising instructions, which when executed by one or more processors of a first device, cause the first device to: determine that an event condition has been met; in response to determining that the event condition has been met: transmit, to a second device, instructions to present a first alert at the second device at a first time indicating that the event condition has been met; and present, at the first device at a second time, a second alert indicating that the event condition has been met; and wherein: the second device is different from the first device, the second alert is different from the first alert, and the second time is selected so as to be spaced apart from the first time by at least a predetermined delay time period.

In accordance with some embodiments, a transitory computer readable storage medium stores one or more programs, the one or more programs comprising instructions, which when executed by one or more processors of a first device, cause the first device to: determine that an event condition has been met; in response to determining that the event condition has been met: transmit, to a second device, instructions to present a first alert at the second device at a first time indicating that the event condition has been met; and present, at the first device at a second time, a second alert indicating that the event condition has been met; and wherein: the second device is different from the first device, the second alert is different from the first alert, and the second time is selected so as to be spaced apart from the first time by at least a predetermined delay time period.

In accordance with some embodiments, a first device comprises: means for determining that an event condition has been met; means, responsive to determining that the event condition has been met, for: transmitting, to a second device, instructions to present a first alert at the second device at a first time indicating that the event condition has been met; and presenting, at the first device at a second time, a second alert indicating that the event condition has been met; and wherein: the second device is different from the first device, the second alert is different from the first alert, and the second time is selected so as to be spaced apart from the first time by at least a predetermined delay time period.

In accordance with some embodiments, a first device comprises: a determining unit configured to determine that an event condition has been met; a transmitting unit configured to transmit, in response to determining that the event condition has been met, to a second device, instructions to present a first alert at the second device at a first time indicating that the event condition has been met; a presenting unit configured to present, in response to determining that the event condition has been met, at the first device at a second time, a second alert indicating that the event condition has been met; and wherein: the second device is different from the first device, the second alert is different from the first alert, and the second time is selected so as to be spaced apart from the first time by at least a predetermined delay time period.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing navigation alerts, thereby increasing the effectiveness, efficiency, and user satisfaction with such devices. Such methods and interfaces may complement or replace other methods for managing navigation alerts.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6G illustrate exemplary techniques and user interfaces for managing navigation alerts in accordance with some embodiments.

DESCRIPTION OF EMBODIMENTS

Figure 1A:
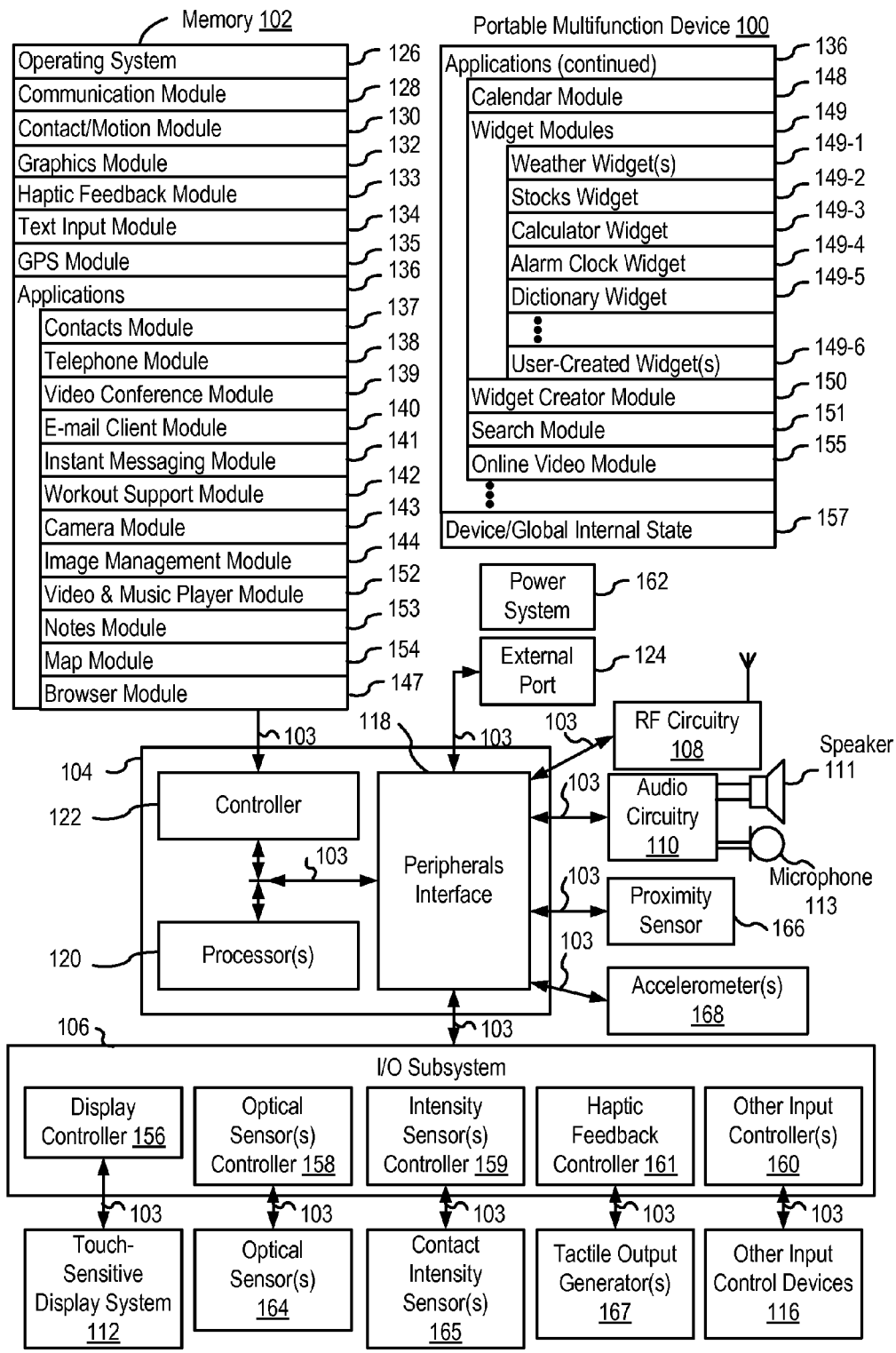
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing navigation alerts. For example, a technique that uses two separate electronic devices to alert the user of the same navigational instruction at different times allows the user to react to the navigational instructions for effectively. As a result, the user is less likely to stray from the route recommended by the electronic device. Such techniques can reduce the cognitive burden on users who access navigation alerts, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing navigation alerts. FIGS. 6A-6G illustrate exemplary techniques and user interfaces for navigation alerts. The user interfaces in the figures are also used to illustrate the processes described below, including the processes in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
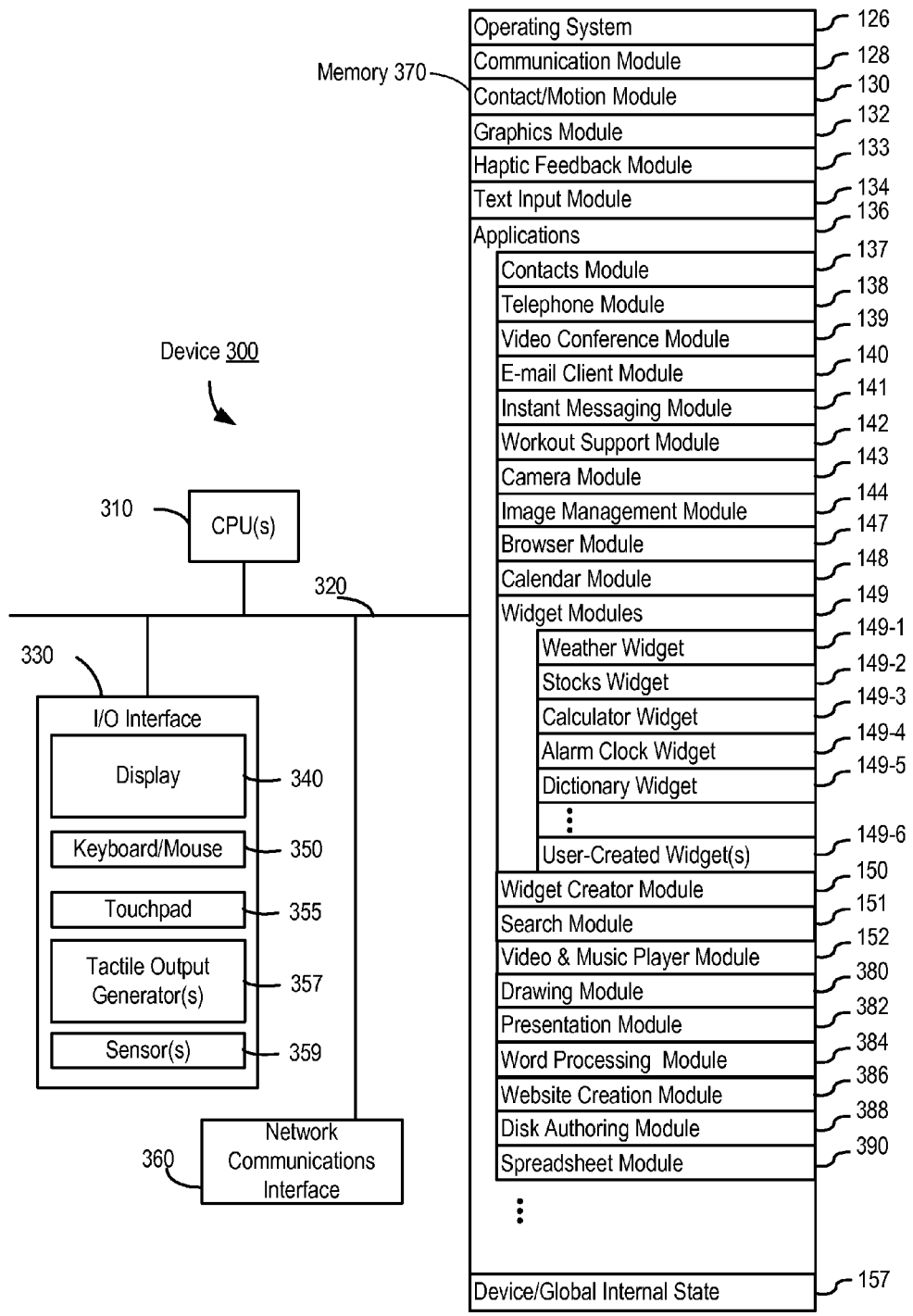
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts).

Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conferencing module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
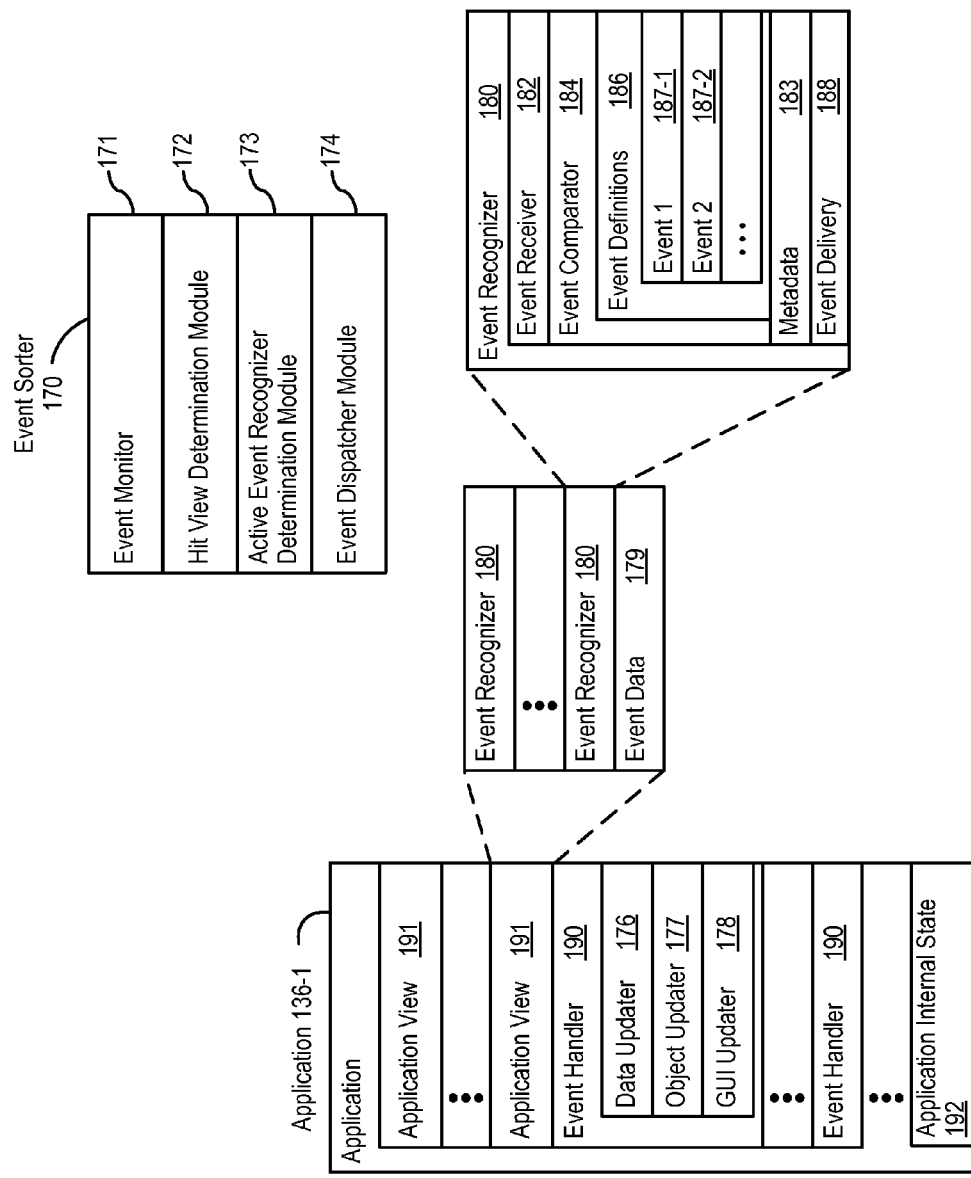
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
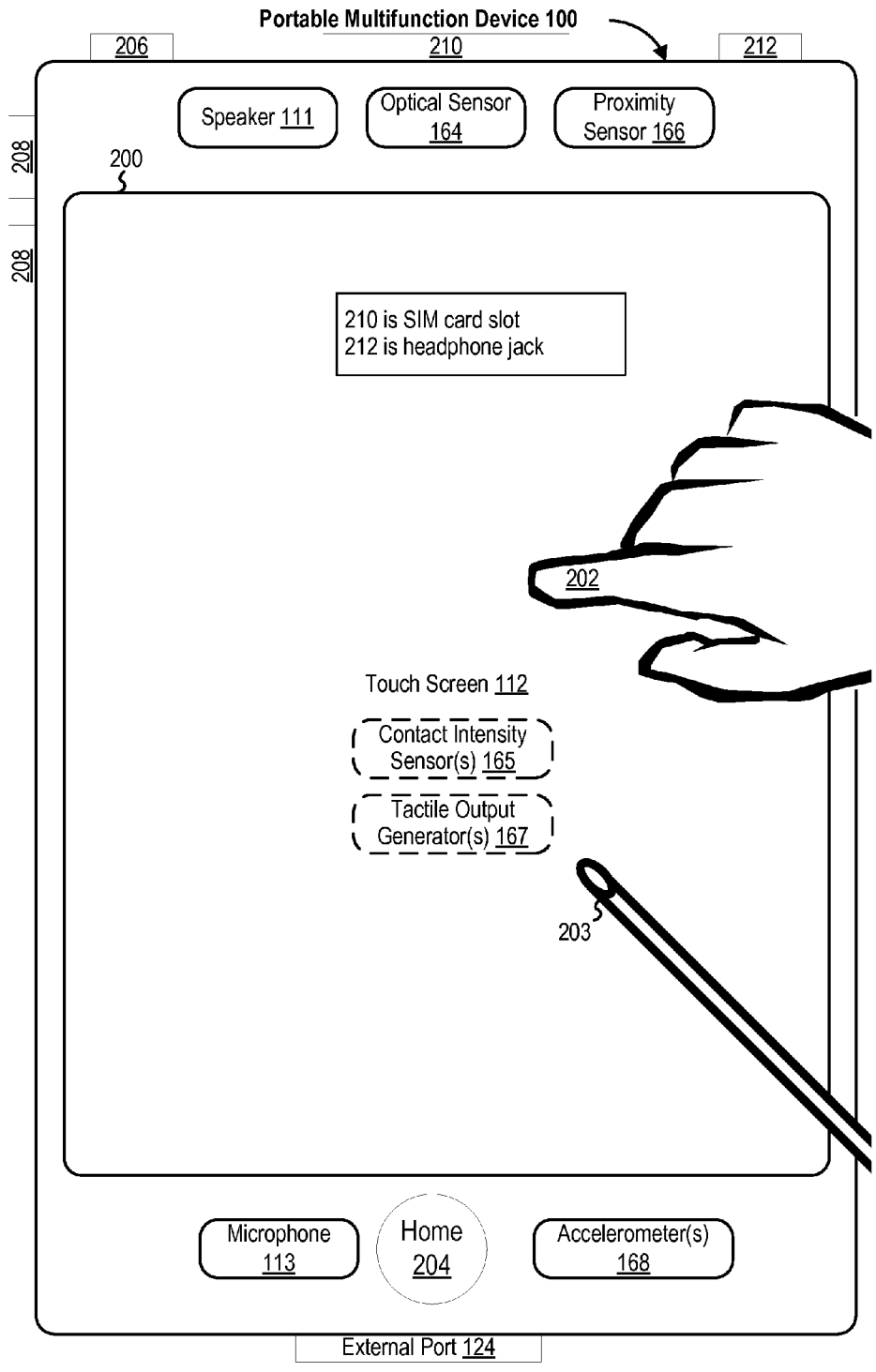
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
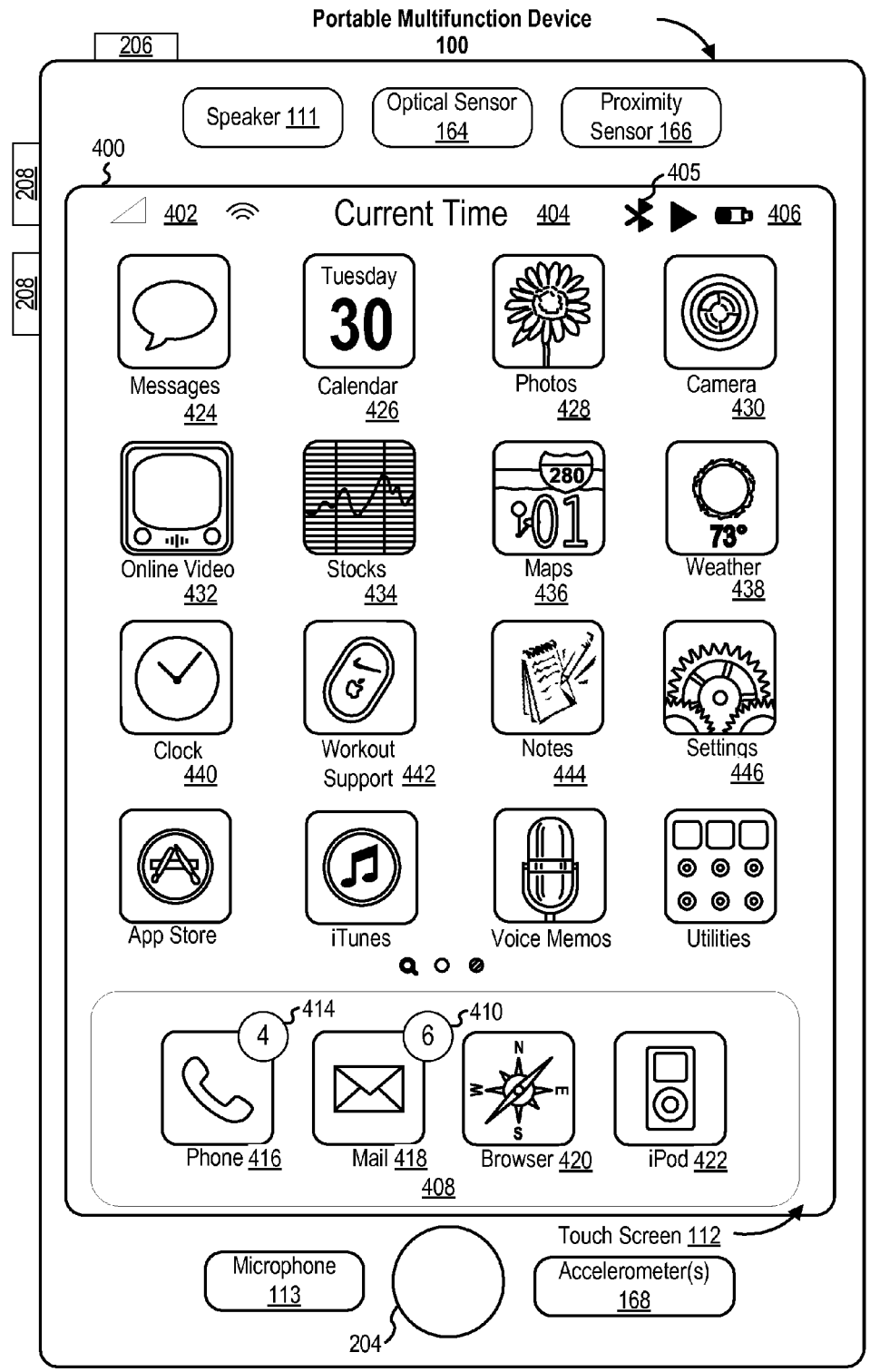
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
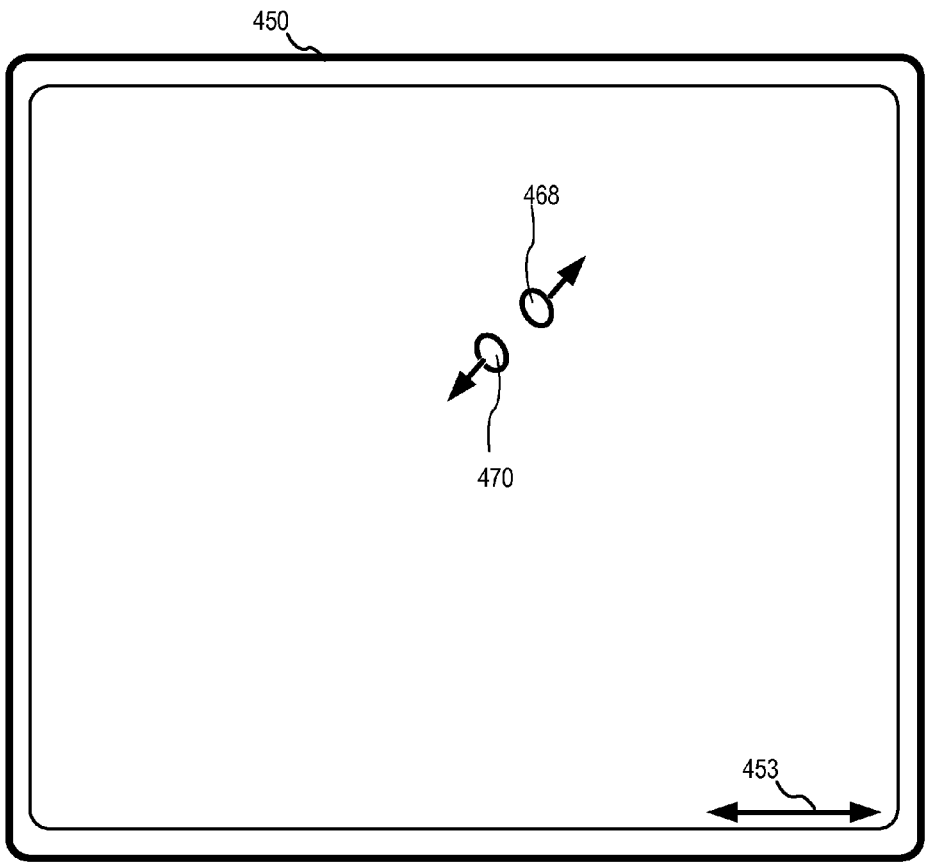
FIG. 4B illustrates an exemplary user interface for a multifunction device with a touch-sensitive surface that is separate from the display in accordance with some embodiments.
Figure 4B:
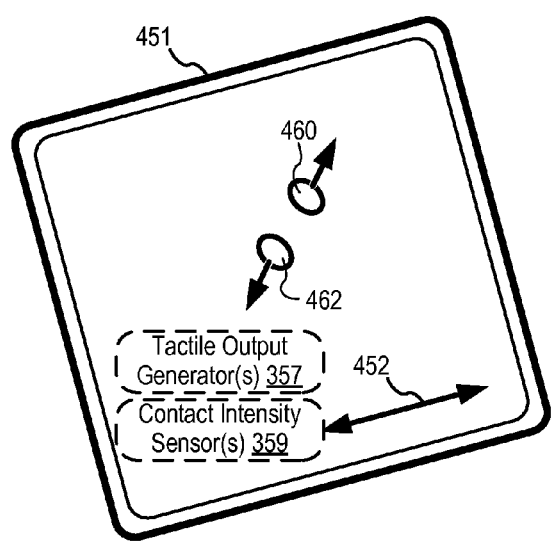

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
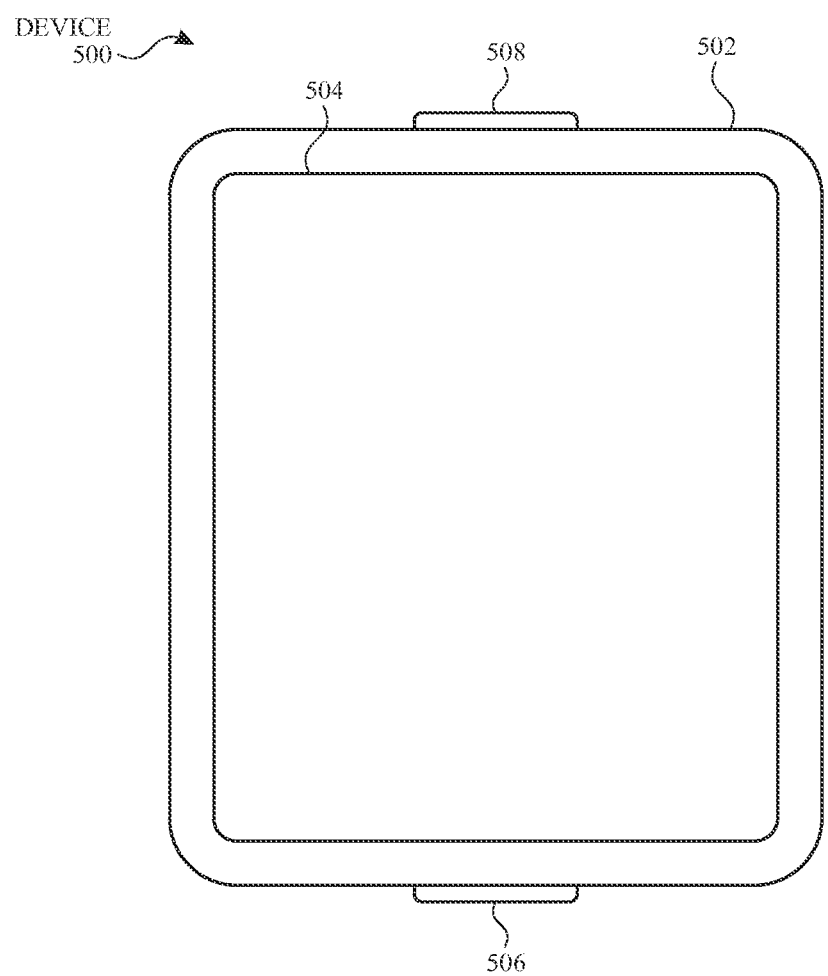
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
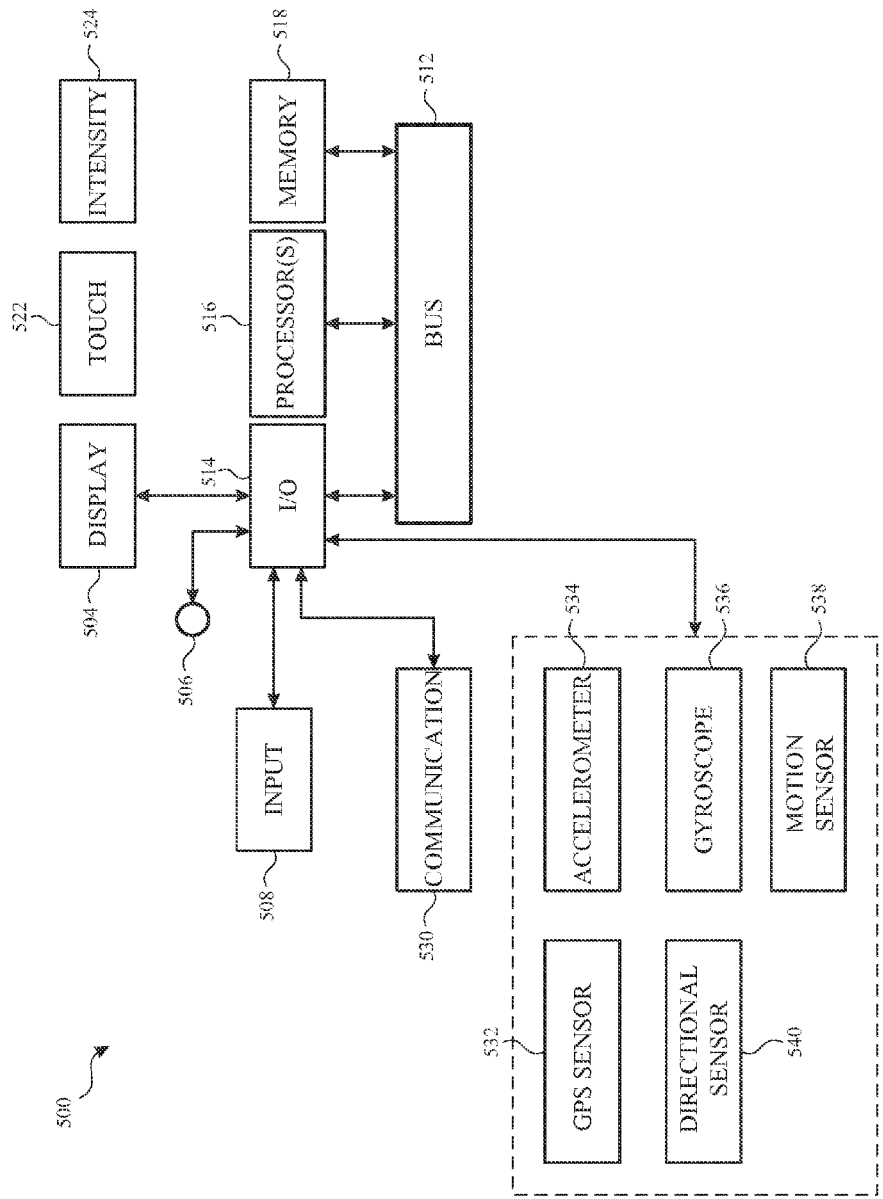
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including process 700 (FIG. 7). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIGS. 6A-6G illustrate exemplary techniques and user interfaces for managing navigation alerts in accordance with some embodiments. The user interfaces in these figures are used to illustrate the processes described below, including the process in FIG. 7.

Figure 6A:
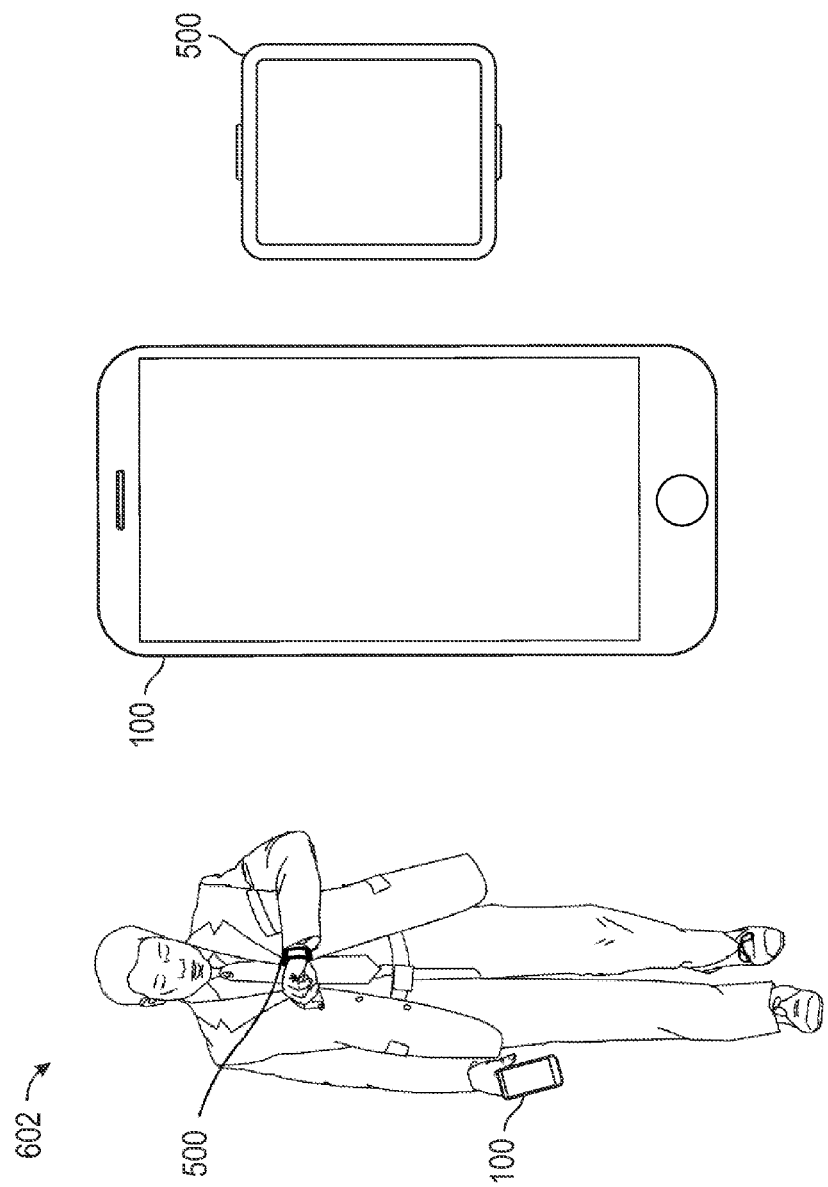

FIG. 6A illustrates user 602. User 602 is carrying a first device 100, such as an electronic device, a cellular telephone, a smartphone, or a tablet computing device. User 602 is also wearing a second device 500, such as a wearable computing device, a smartwatch, or wearable fitness monitor. In some examples, the first device wirelessly sends communications to the second device. In some examples, the first device and the second device are in bidirectional wireless communication.

Figure 6B:
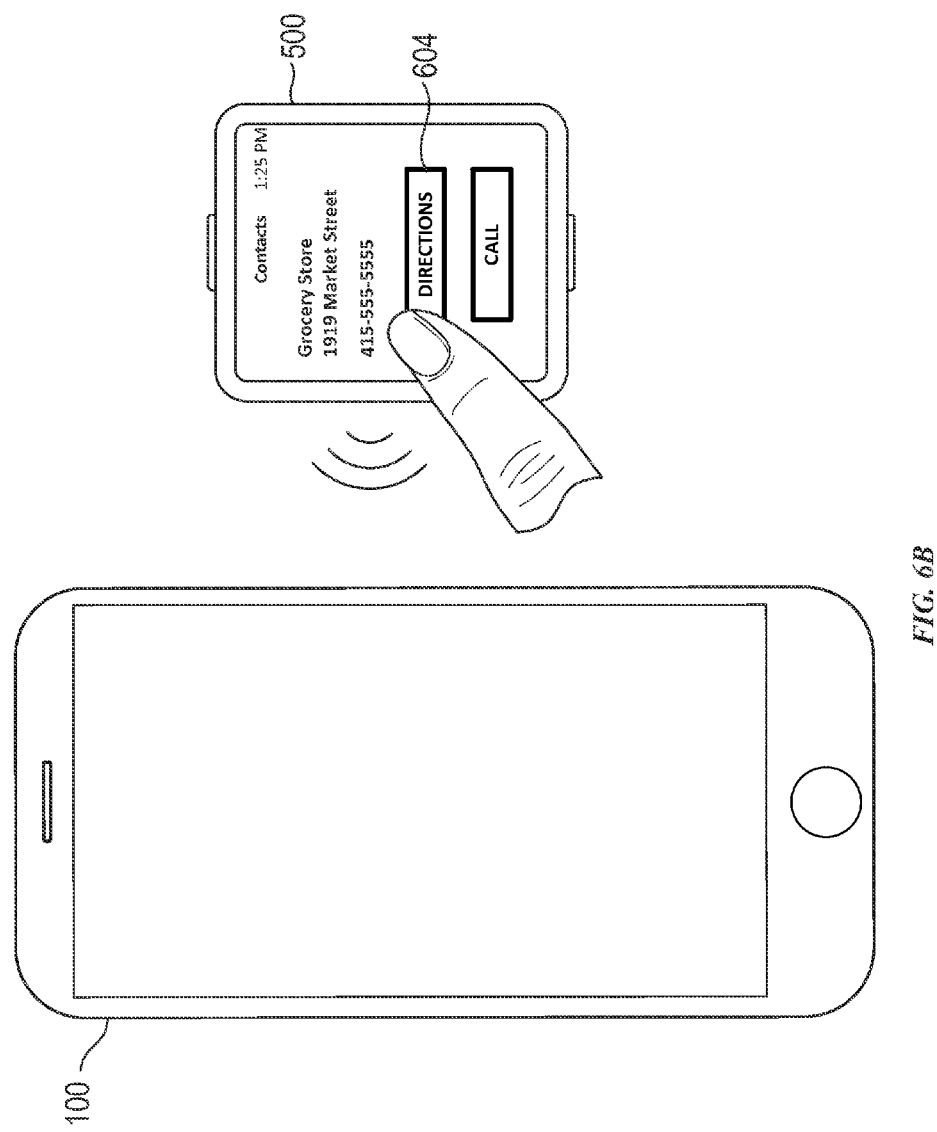

In accordance with some embodiments, at FIG. 6B, the second device 500 optionally receives user input (e.g., touch input on a displayed affordance 604 of second device 500) requesting route directions. The second device transmits information indicative of the request for route directions to the first device. Alternatively (or in addition), in accordance with some embodiments, at FIG. 6G, the first device optionally receives the user input (e.g., touch input on a displayed affordance 624 of first device 100) requesting route directions, including information indicative of the request for route directions. For example, the user may want navigational route directions between their (and device 100's) current location and a selected destination.

Figure 6C:
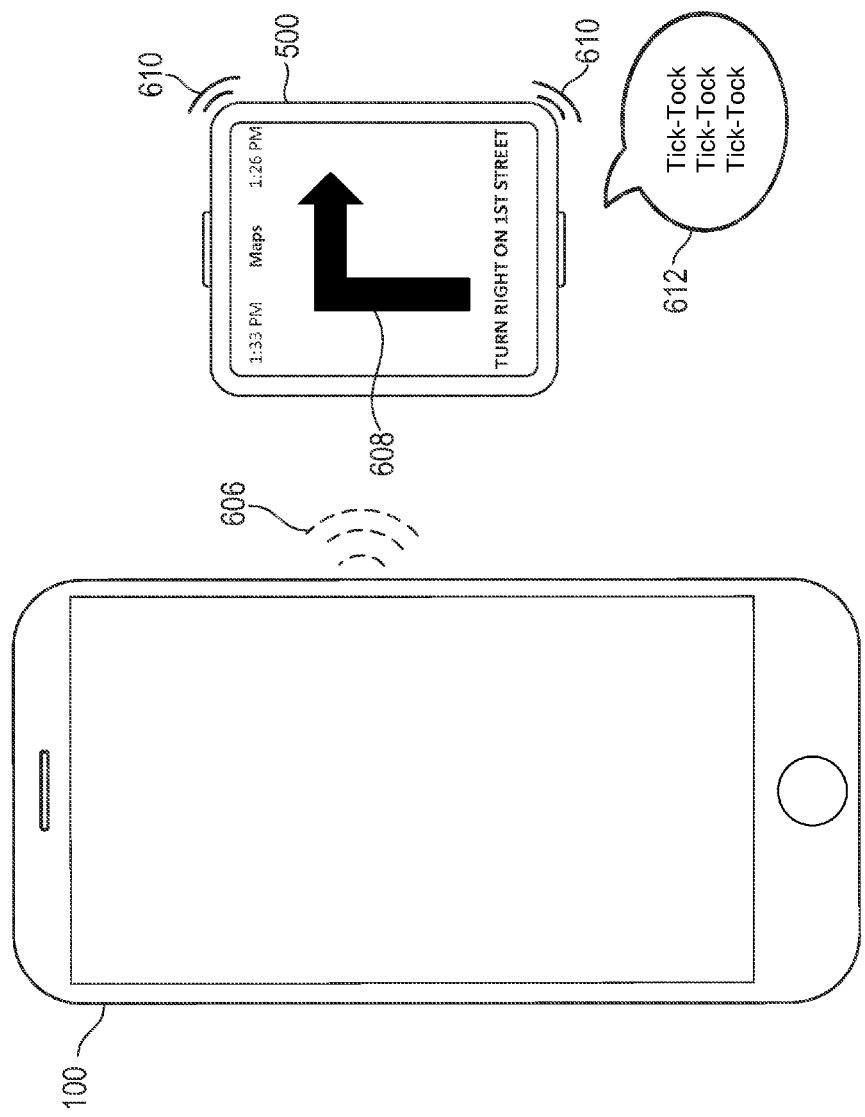
Figure 6D:
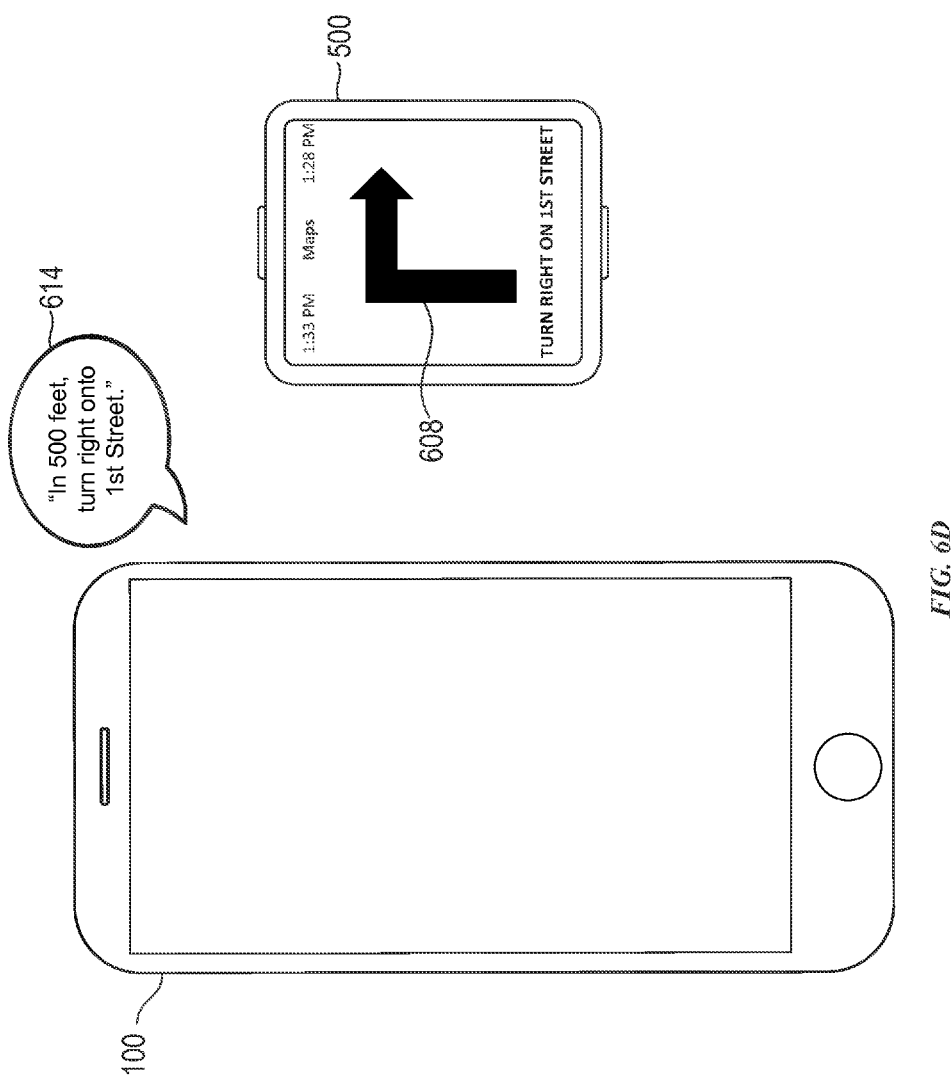

At FIG. 6C, the first device 100 (e.g., an electronic device, such as a phone) determines that an event condition has been met (e.g., the device determines that it is within a certain distance of an approaching planned turn, such as a right turn on a street). In response to determining that the event condition has been met, the first device transmits (e.g., using RF 606), to a second device 500 (e.g., an electronic device, such as a smartwatch), instructions to present a first alert (e.g., a visual alert 608, a haptic alert 610, and/or an audio alert 612) at the second device 500 at a first time indicating that the event condition has been met. At FIG. 6D, in response to determining that the event condition has been met, the first device also presents, at the first device at a second time, a second alert (e.g., a visual alert, a haptic alert, and/or an audio alert 614) indicating that the event condition has been met. The second device 500 is different from the first device 100, the second alert (e.g., a visual alert, a haptic alert, and/or an audio alert 614), is different from the first alert (e.g., a visual alert 608, a haptic alert 610, and/or an audio alert 612), and the second time is selected so as to be spaced apart from the first time by at least a predetermined delay time period. This allows the alerts to be presented in a coordinated alert sequence.

In some embodiments, determining that the event condition has been met includes determining that a route event in an ordered set of route events (e.g., a list of driving/walking directions or instructions) for navigating a route from a first location (e.g., the current location of the first device 100 or the second device 500) to an end location (e.g., a destination) is upcoming (e.g., within a certain distance or time based on current/average speed).

In some embodiments, the second time is selected so as to be at least the predetermined delay time period after the first time. Thus, the first alert at the second device occurs before the second alert at the first device. This allows the user to be notified (using the first alert at the second device 500) that the second alert at the first device 100 is about to occur.

In some embodiments, the first device 100 is a portable computing device (e.g., a smartphone or a tablet computing device) and the second device 500 is a wearable computing device (e.g., a smartwatch or wearable fitness monitor).

In some embodiments, the first alert is of a first type and the second alert is of a second type that is different from the first type. The first type and the second type are selected from the group consisting of haptic, audio, and visual. For example, if the first alert is a haptic alert, then the second alert is either an audio alert or a visual alert. For another example, if the first alert is a visual alert, the second alert is either a haptic alert or an audio alert. This allows the user to better differentiate between the two alerts received at the two devices and to not misidentify the two alerts.

In some embodiments, the second alert includes an audio (e.g., spoken, audible) component without a haptic component and the first alert includes a haptic component (e.g., and the second alert includes a haptic component). By differentiating the alerts in this manner, the user is able to better differentiate between the alerts received at the devices and to not misidentify the two alerts. Additionally, in many circumstances the user will be aware of both alerts, and by having different alerts occur at different devices at different times, the user will experience the alerts as part of a coordinated alert sequence that occurs across multiple devices rather than as a set of overlapping and possibly conflicting alerts that correspond to a single event (e.g., an instruction to turn left). Providing alerts on both devices also ensures that if the user is able to receive alerts from one device (e.g., a smartwatch worn on the user's wrist) but is not able to receive alerts from the other device (e.g., a phone that is in the user's backpack or purse), the user will still receive the alert. As such, one advantage of providing a coordinated alert sequence is to that it provides the user with redundant alerts that do not conflict with each other in circumstances when the user is aware of (e.g., hears, feels, and/or sees) all of the alerts in the coordinated alert sequence.

In some embodiments, the predetermined delay time period is based on the event condition. In some examples, if the event condition is an upcoming freeway exit that the user should take, the predetermined delay time period is longer because the device/user is moving faster. In some examples, the predetermined delay time period is shorter when the device/user is moving slower (e.g., when the user is walking or biking).

In some embodiments, the first alert includes a first haptic output that is different from a second haptic output included in the second alert. By differentiating the alerts in this manner, the user is able to better differentiate between the alerts received at the devices and to not misidentify the two alerts.

In some embodiments, similar to the discussion of FIGS. 6B and 6G, the first device 100 receives information indicative (e.g., the information is received at the first device and includes include destination information) of a request for route directions (e.g., the request having been initially received at the first device or the second device). In response to receiving information indicative of the request for route directions, the first device 100 calculates (or requests from a remote server or other remote computing device) an ordered set of route events (e.g., a list of driving/walking directions or instructions) for navigating a route from a first location (e.g., the current location) to an end location (e.g., a destination).

In some embodiments, the first alert includes a visual indicator 608 (e.g., a right arrow indicator to indicate right turn) of a first route event (e.g., instruction to turn right at a particular street) of the ordered set of route events and a haptic output 610 associated with (e.g., based on if it is directional and/or varies based on direction type of left/right) the first route event (e.g., instruction to turn right at a particular street) of the ordered set of route events. Thus, in some examples, the first alert is both visual and haptic. In some examples, the haptic output 610 is directional, as illustrated by 610 of FIG. 6C. For example, the haptic output alert for a right turn is on the right side of second device 500 or transitions from the left side of the second device 500 to the right side of the second device 500. For another example, the haptic output alert for a left turn is on the left side of second device 500 or transitions from the right side of the second device 500 to the left side of the second device 500.

In some embodiments, presenting the second alert includes initiating playback (e.g., at the first device) of an audio alert 612 (e.g., a synthesized voice instruction to turn right) based on a first route event (e.g., instruction to turn right at a particular street) of the ordered set of route events.

In some embodiments, the predetermined delay time period is between one second and three seconds, between 1.5 seconds and 2.5 seconds, or is 2 seconds. These give the user sufficient time to appreciate that an alert is coming and expect an alert at the first device, without providing too much of a delay where the user does not associate the two alerts with each other.

One way to implement these techniques is on a system that uses "announce", "prepare", "pre-execute", and "execute" alerts to the user as part of a coordinated alert sequence while the user is following a route (either in a vehicle or while walking/jogging). In some examples, the announce alert is activated at the first device 100 right after the first device 100 detects that the user has followed a previous instruction (e.g., right after the user makes a turn in accordance with the route the device has suggested). This type of alert provides guidance to the user to know what the immediate next instruction will be. For example, an announce alert indicates to the user what the next instruction will be (e.g., "In ten miles, make a right turn at Market Street."). In an example of the announce alert using a coordinated alert sequence, an additional announce alert is initiated at the second device 500 right after the user makes the turn and prior to the announce alert being activated at the first device 100.

In some examples, the prepare alert is activated at the first device 100 a determined distance before the next user has to follow the next turn (based on distance to the next turn). In some embodiments, this alert is only displayed or otherwise presented at the first device 100. However, if the user views (or turns on the display be lifting their wrist with the second device 500) the display of the second device 500, the second device 500 will display a visual alert that indicates the same next turn (or other instruction) using a coordinated alert sequence. For example, the coordinated alert sequence includes a prepare alert (e.g., a haptic) at the second device 500 prior to a prepare alert (e.g., voice instruction) at the first device 100.

In some examples, the pre-execute alert is limited to the second device, and notifies the user so that the user expects the execute alert at the first device. These two alerts (pre-execute and execute) are optionally activated dynamically (based on speed of travel, distance to next turn, how long the audio voice instruction playback will take). The pre-execute alert tells the user to expect an instruction that should be followed, while the execute alert tells the user to perform the indicated instruction. A coordinated alert sequence optionally includes the pre-execute alert at the second device 500, followed two seconds later by the execute alert at the first device 100.

Figure 6E:
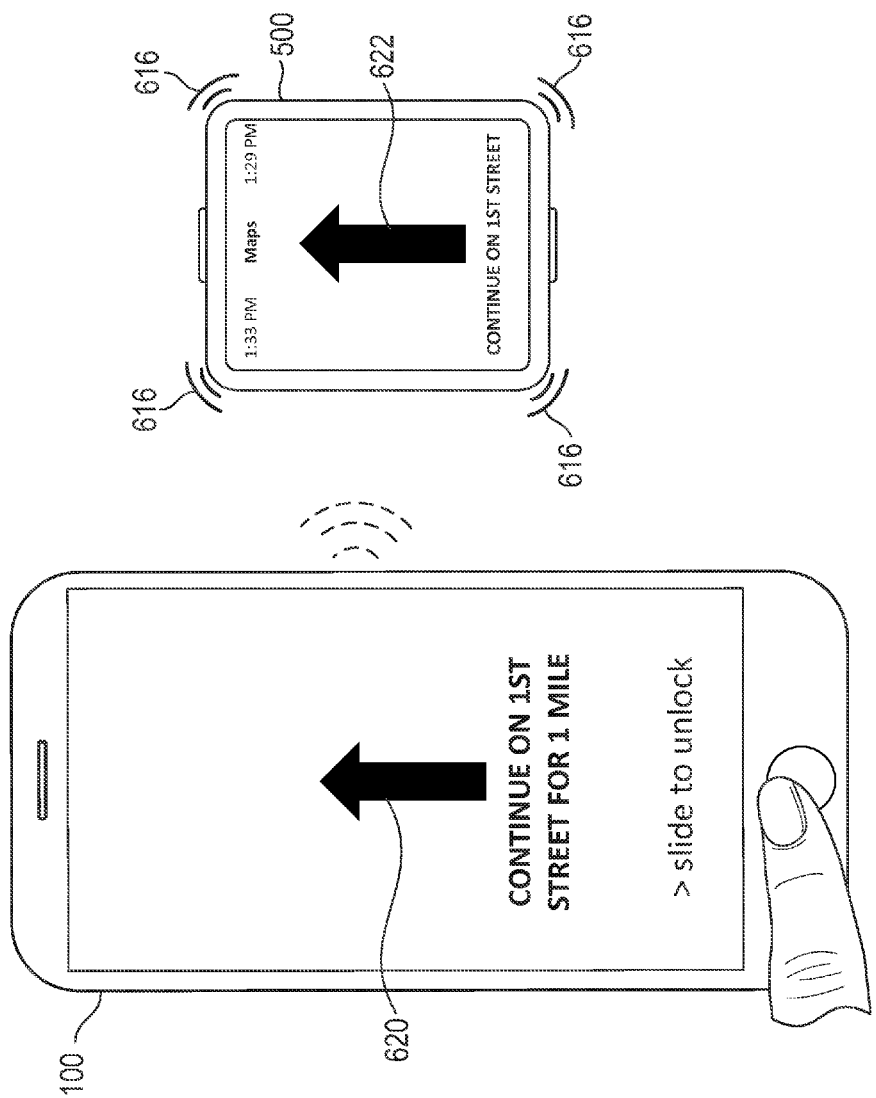
Figure 6F:
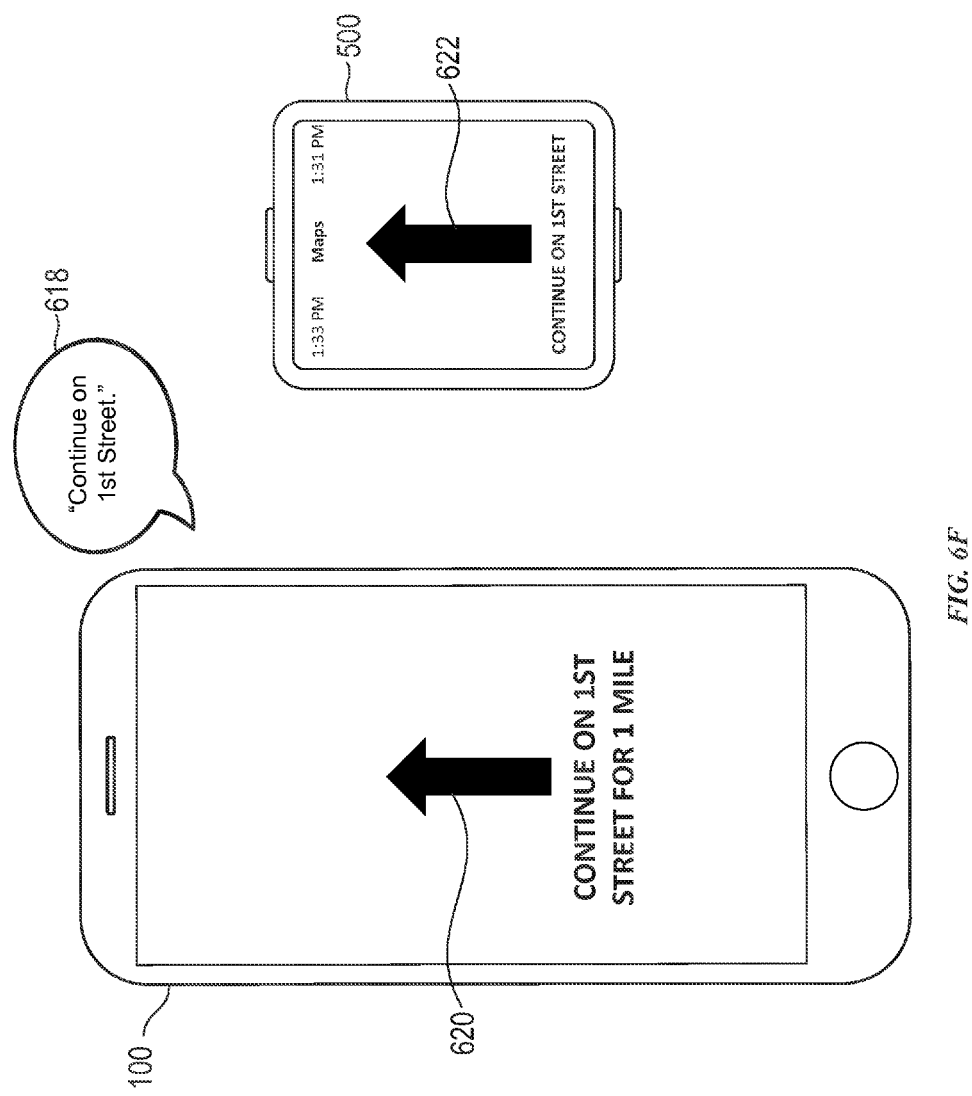

In some embodiments, as illustrated in FIGS. 6E and 6F, while the alerts are different for the two devices (e.g., haptic alert 616 at second device 500, audio alert 618 at first device 100) and occur at different times (e.g., at the second device 500 in FIG. 6E, then later in time at the first device 100 in FIG. 6F), both devices (e.g., first device 100 and second device 500) show synchronized visual guidance (e.g., visual alerts 620 and 622). For example, both the first device 100 (e.g., a phone) and the second device 500 (e.g., a smartwatch), if their displays are active, will show instructions (e.g., visual alerts 620 and 622) to continue on a road when the user should continue on the road, even though the second device 500 will provide a "pre-execute" notification (e.g., earlier alert) before the "execute" notification (e.g., later alert) is provided by the first device 100 (e.g., the phone). For another example, both the first device 100 (e.g., a phone) and the second device 500 (e.g., a smartwatch), if their displays are active, will show instructions to make a turn when there is an upcoming turn, even though the second device 500 will provide a "pre-execute" notification before the "execute" notification is provided by the first device. This allows the benefit that the user can look at either device to determine what to do next. At the same time, the user can rely on the time-different alerts at the different devices to time the next action the user will take.

In some circumstances, if both the displays for both the phone (e.g., first device) and the smartwatch (e.g., second device) are on at the same time, the user interfaces on both devices will be simultaneously (or near simultaneously) updated to display the instructions to make a turn, while the pre-execute notification will be provided at the smartwatch before the execute notification is provided at the phone. This mix of concurrent and staggered notifications provides the user with a consistent user interface (e.g., both devices show the same information when the user checks them, so that it doesn't appear that there is a lag in communication) while still providing the advantages of a staggered set of alerts so that the user is warned that verbal instructions are coming. For example, an alert at the second device 500 (e.g., smartwatch) warns the user that verbal instructions will be coming from the first device 100 (e.g., smartphone).

In some embodiments, in accordance with the event condition being of a first type (e.g., right turn instruction), the first alert includes a first haptic output (e.g., directional haptic output 610). In accordance with the event condition being of a second type (e.g., left turn direction or "go straight" direction), the first alert includes a second haptic output (e.g., non-directional haptic output 616) that is different from the first haptic output 610. For example, the haptic output indicating to the user to continue on the same road is a simple (e.g., second type) haptic output (e.g., same as other alerts on the device that do not require prompt attention by the user), while haptic alerts indicating right or left turns are of a special type (e.g., first type). Thus, navigation instructions requiring prompt attention (or a change in course) are distinguished from other navigation alerts. Some examples of haptic alert types includes an announce haptic alert type (e.g., such as notifying the user of the next instruction right after the user executes the previous instruction; non-directional haptic alert), a prepare haptic alert type (e.g., such as based on distance to physical world location where the next instruction should be executed; non-directional haptic alert), a pre-execute alert type (e.g., occurring a predetermined period of time before an instruction to execute a maneuver; non-directional haptic alert), an execute alert type (e.g., instruction to execute a maneuver), a turn haptic alert type (e.g., pre-execute or execute instruction for left turns and right turns; directional haptic alert), a right turn haptic alert type (e.g., pre-execute or execute instruction for a right turn; directional haptic alert), and a left turn haptic alert type (e.g., pre-execute or execute instruction for a left turn; directional haptic alert).

Figure 7:
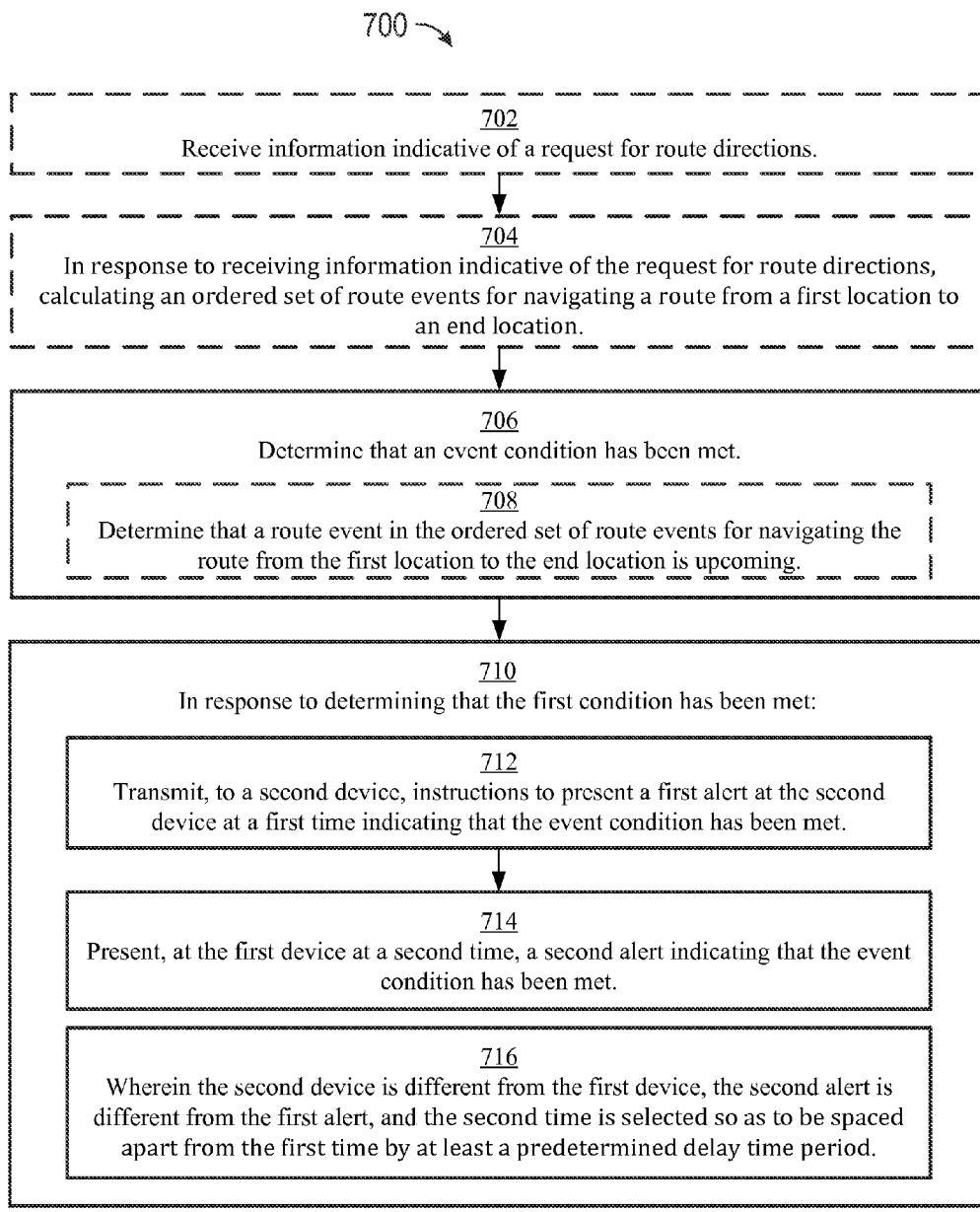
FIG. 7 is an exemplary flow diagram illustrating a method for managing navigation alerts using an electronic device in accordance with some embodiments.

FIG. 7 is an exemplary flow diagram illustrating a method for managing navigation alerts using an electronic device in accordance with some embodiments. Method 700 is performed at a first device (e.g., 100 or 300). Some operations in method 700 may be combined, the order of some operations may be changed, and some operations may be omitted.

As described below, method 700 provides an intuitive way for managing navigation alerts. The method reduces the cognitive burden on a user for managing navigation alerts, thereby creating a more efficient human-machine interface. For battery-operated computing devices, enabling a user to receive navigation alerts faster, less often, and more efficiently conserves power and increases the time between battery charges.

In some embodiments, at block 702, the first device 100 optionally receives information indicative (e.g., the information is received at the first device 100 and optionally includes destination information) of a request for route directions (e.g., the request having been initially received at the first device or the second device).

In some embodiments, at block 704, in response to receiving information indicative of the request for route directions, first device 100 optionally calculates (or requests from a remote server) an ordered set of route events (e.g., a list of driving/walking directions or instructions) for navigating a route from a first location (e.g., the current location) to an end location (e.g., a destination).

At block 706, the first device 100 determines that an event condition has been met. In some embodiments, at block 708, the first device 100 optionally determines that a route event in an ordered set of route events (e.g., a list of driving/walking directions or instructions) for navigating a route from a first location (e.g., the current location) to an end location (e.g., a destination) is upcoming.

At block 710, in response to determining that the event condition has been met, the first device performs blocks 712 and 714. At block 712, the first device 100 transmits (e.g., using RF 606), to a second device 500 (e.g., an electronic device 500, such as a smartwatch), instructions to present a first alert (e.g., a visual alert 608, a haptic alert 610, and/or an audio alert 612) at the second device 500 at a first time indicating that the event condition has been met. At block 714, the first device 100 presents, at the first device 100 at a second time, a second alert (e.g., a visual alert, a haptic alert, and/or an audio alert 614) indicating that the event condition has been met. At block 716, the second device 500 is different from the first device 100, the second alert is different from the first alert, and the second time is selected so as to be spaced apart from the first time by at least a predetermined delay time period.

In some embodiments, the second time is selected so as to be at least the predetermined delay time period after the first time (e.g., the first alert at the second device occurs before the second alert at the first device). In some embodiments, the predetermined delay time period is based on the event condition (e.g., longer when moving faster, shorter when moving slower). In some embodiments, the predetermined delay time period is between 1 second and 3 seconds, between 1.5 seconds and 2.5 seconds, or is 2 seconds. In some embodiments, the first device 100 is a portable computing device (e.g., a smartphone or a tablet computing device) and the second device 500 is a wearable computing device (e.g., a smartwatch or wearable fitness monitor).

In some embodiments, the first alert is of a first type and the second alert is of a second type that is different from the first type, the first type and the second type selected from the group consisting of haptic, audio, and visual. In some embodiments, the second alert includes an audio (e.g., spoken, audible) component without a haptic component and the first alert includes a haptic component (e.g., and the second alert includes a haptic component).

In some embodiments, the first alert includes a first haptic output that is different from a second haptic output included in the second alert. In some embodiments, the first alert includes a visual indicator (e.g., a right arrow indicator to indicate right turn) of a first route event (e.g., instruction to turn right at a particular street) of the ordered set of route events and a haptic output associated with (e.g., based on if it is directional and/or varies based on direction type of left/right) the first route event (e.g., instruction to turn right at a particular street) of the ordered set of route events. In some embodiments, presenting the second alert includes initiating playback (e.g., at the first device) of an audio alert (e.g., a synthesized voice instruction to turn right) based on a first route event (e.g., instruction to turn right at a particular street) of the ordered set of route events.

In some embodiments, in accordance with the event condition being of a first type (e.g., right turn instruction), the first alert includes a first haptic output. In accordance with the event condition being of a second type (e.g., left turn direction or "go straight" direction), the first alert includes a second haptic output that is different from the first haptic output. For example, a "continue" haptic signal is simple tap (same as other alerts on device that do not require prompt attention by the user). Thus, urgent navigation alerts are distinguished from other navigation alerts.

In some embodiments, in accordance with determining that the event condition is of a first type (e.g., right turn instruction), initiating a first haptic output as part of the first alert. In accordance determining that the event condition is of a second type (e.g., left turn direction or "go straight" direction), initiating a second haptic output as part of the first alert, wherein the second haptic output is different from the first haptic output. For example, a "continue" haptic signal is simple tap (same as other alerts on device that do not require prompt attention by the user). Thus, urgent navigation alerts are distinguished from other navigation alerts.

Figure 8:
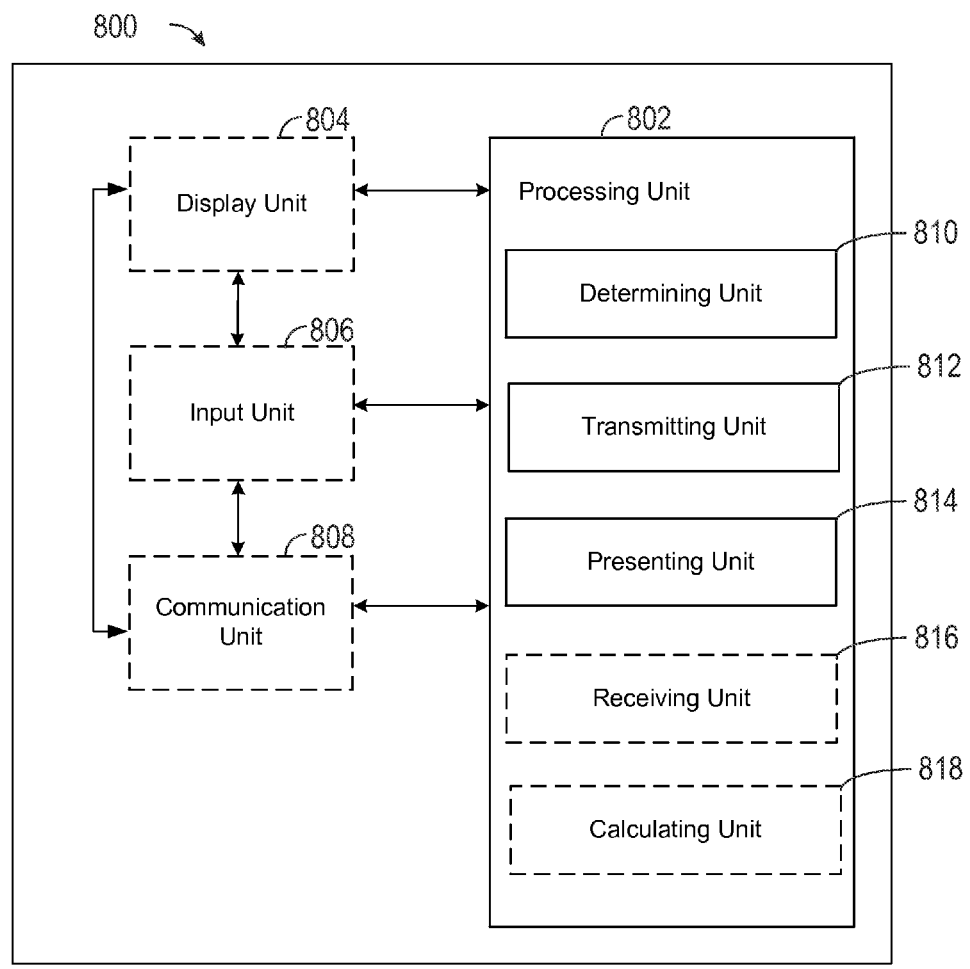
FIG. 8 shows an exemplary functional block diagram of an electronic device 800 configured in accordance with the principles of the various described embodiments.

FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 (e.g., a first device) includes a processing unit 802 and, optionally, a display unit 804, an input unit 806 for receiving inputs, and a communication unit 808 for communicating with a second device.

In some embodiments, the processing unit 802 includes one or more of: a determining unit 810, a transmitting unit 812, and a presenting unit 814. Optionally, the processing unit 802 also includes one or more of a receiving unit 816 and a calculating unit 818. The units of FIG. 8 may be configured to implement the various techniques and methods described above with respect to FIGS. 6-7.

The determining unit 810 is configured to determine that an event condition has been met. The transmitting unit 812 is configured to transmit (e.g., using the communication unit 808), in response to determining that the event condition has been met, to a second device (e.g., an electronic device, such as a smartwatch), instructions to present a first alert (e.g., a visual alert, a haptic alert, and/or an audio alert) at the second device at a first time indicating that the event condition has been met. The presenting unit 814 is configured to present, in response to determining that the event condition has been met, at the first device at a second time, a second alert (e.g., a visual alert via display unit 804, a haptic alert, and/or an audio alert) indicating that the event condition has been met, wherein the second device is different from the first device, the second alert is different from the first alert, and the second time is selected so as to be spaced apart from the first time by at least a predetermined delay time period.

In some embodiments, determining unit 810 is configured to determine that a route event in an ordered set of route events (e.g., a list of driving/walking directions or instructions) for navigating a route from a first location (e.g., the current location) to an end location (e.g., a destination) is upcoming.

In some embodiments, the second time is selected so as to be at least the predetermined delay time period after the first time.

In some embodiments, the first device is a portable computing device and the second device is wearable computing device.

In some embodiments, the first alert and the second alert are different types of alerts (e.g., haptic vs audible vs visual).

In some embodiments, the second alert includes an audio (e.g., spoken, audible) component without a haptic component and the first alert includes a haptic component (e.g., and the second alert includes a haptic component).

In some embodiments, the predetermined delay time period is based on a type of the event condition (e.g., longer when moving faster, shorter when moving slower).

In some embodiments, the first alert includes a first haptic output that is different from a second haptic output included in the second alert.

In some embodiments, the receiving unit 816 is configured to receive information indicative (e.g., the information is received at the first device via the input unit 806 and optionally includes destination information) of a request for route directions (e.g., the request having been initially received at the first device or the second device). The calculating unit 818 is configured to calculate, in response to receiving information indicative of the request for route directions, (or requesting from a remote server) an ordered set of route events (e.g., a list of driving/walking directions or instructions) for navigating a route from a first location (e.g., the current location) to an end location (e.g., a destination).

In some embodiments, the first alert includes a visual indicator (e.g., a right arrow indicator to indicate right turn) of a first route event (e.g., instruction to turn right at a particular street) of the ordered set of route events and a haptic output associated with (e.g., based on if it is directional and/or varies based on direction type of left/right) the first route event (e.g., instruction to turn right at a particular street) of the ordered set of route events.

In some embodiments, the presenting unit is configured to initiate playback (e.g., at the first device) of an audio alert (e.g., a synthesized voice instruction to turn right) based on a first route event (e.g., instruction to turn right at a particular street) of the ordered set of route events.

In some embodiments, the predetermined delay time period is between one and three seconds (or between 1.5 seconds and 2.5 seconds, or is 2 seconds).

In some embodiments, in accordance with the event condition being of a first type (e.g., right turn instruction), the second alert includes a first haptic output. In accordance with the event condition being of a first type (e.g., left turn direction or "go straight" direction), the second alert includes a second haptic output that is different from the first haptic output.

The operations described above with reference to FIG. 7 are, optionally, implemented by components depicted in FIG. 1A-1B, 2, 3, 5A-B, or 8. For example, receiving operation 702, determining operation 706, and transmitting operation 708 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium comprising one or more programs for execution by one or more processors of a first device, the one or more programs including instructions for:
    receiving, from a second device, a request to initiate navigation based on one or more user inputs received at the second device;
    based on the request to initiate navigation, monitoring for the occurrence of event conditions related to the navigation;
    while monitoring for the occurrence of event conditions related to the navigation, determining that an event condition related to the navigation has been met, wherein the event condition corresponds to a respective suggested action;
    in response to determining that the event condition has been met:
        transmitting, to the second device, instructions to present a first alert at the second device at a first time indicating that the event condition has been met that serves as a prompt to perform the respective suggested action; and
        presenting, at the first device at a second time, a second alert indicating that the event condition has been met that also serves as a prompt to perform the same suggested action; and
    wherein:
        the second device is different from the first device,
        the second alert is different from the first alert, and
        the second time is selected so as to be spaced apart from the first time by at least a predetermined delay time period.

2. The non-transitory computer-readable storage medium of claim 1, wherein determining that the event condition has been met includes determining that a route event in an ordered set of route events for navigating a route from a first location to an end location is upcoming.

3. The non-transitory computer-readable storage medium of claim 1, wherein the second time is selected so as to be at least the predetermined delay time period after the first time.

4. The non-transitory computer-readable storage medium of claim 1, wherein the first device is a portable computing device and the second device is a wearable computing device.

5. The non-transitory computer-readable storage medium of claim 1, wherein the first alert is of a first type and the second alert is of a second type that is different from the first type, the first type and the second type selected from the group consisting of haptic, audio, and visual.

6. The non-transitory computer-readable storage medium of claim 1, wherein the second alert includes an audio component without a haptic component and the first alert includes a haptic component.

7. The non-transitory computer-readable storage medium of claim 1, wherein the predetermined delay time period is based on the event condition.

8. The non-transitory computer-readable storage medium of claim 1, wherein the first alert includes a first haptic output that is different from a second haptic output included in the second alert.

9. The non-transitory computer-readable storage medium of claim 1, further comprising instructions for:
    in response to receiving the request to initiate navigation, calculating an ordered set of route events for navigating a route from a first location to an end location.

10. The non-transitory computer-readable storage medium of claim 9, wherein the first alert includes a visual indicator of a first route event of the ordered set of route events and a haptic output associated with the first route event of the ordered set of route events.

11. The non-transitory computer-readable storage medium of claim 9, wherein presenting the second alert includes initiating playback of an audio alert based on a first route event of the ordered set of route events.

12. The non-transitory computer-readable storage medium of claim 1, wherein the predetermined delay time period is between one and three seconds.

13. The non-transitory computer-readable storage medium of claim 1, wherein:
    in accordance with the event condition being of a first type, the first alert includes a first haptic output; and
    in accordance with the event condition being of a second type, the first alert includes a second haptic output that is different from the first haptic output.

14. The non-transitory computer-readable storage medium of claim 1, wherein presentations of the first alert and the second alert do not overlap in time.

15. A first device, comprising:
    one or more processors; and
    memory storing one or more programs configured to be executed by the one or more processors, the one or more programs including instructions for:
        receiving, from a second device, a request to initiate navigation based on one or more user inputs received at the second device;
        based on the request to initiate navigation, monitoring for the occurrence of event conditions related to the navigation;
        while monitoring for the occurrence of event conditions related to the navigation, determining that an event condition related to the navigation has been met, wherein the event condition corresponds to a respective suggested action;
        in response to determining that the event condition has been met:
            transmitting, to the second device, instructions to present a first alert at the second device at a first time indicating that the event condition has been met that serves as a prompt to perform the respective suggested action; and
            presenting, at the first device at a second time, a second alert indicating that the event condition has been met that also serves as a prompt to perform the same suggested action; and
        wherein:
            the second device is different from the first device,
            the second alert is different from the first alert, and
            the second time is selected so as to be spaced apart from the first time by at least a predetermined delay time period.

16. The first device of claim 15, wherein determining that the event condition has been met includes determining that a route event in an ordered set of route events for navigating a route from a first location to an end location is upcoming.

17. The first device of claim 15, wherein the second time is selected so as to be at least the predetermined delay time period after the first time.

18. The first device of claim 15, wherein the first device is a portable computing device and the second device is a wearable computing device.

19. The first device of claim 15, wherein the first alert is of a first type and the second alert is of a second type that is different from the first type, the first type and the second type selected from the group consisting of haptic, audio, and visual.

20. The first device of claim 15, wherein the second alert includes an audio component without a haptic component and the first alert includes a haptic component.

21. The first device of claim 15, wherein the predetermined delay time period is based on the event condition.

22. The first device of claim 15, wherein the first alert includes a first haptic output that is different from a second haptic output included in the second alert.

23. The first device of claim 15, the one or more programs further including instructions for:
   in response to receiving the request to initiate navigation, calculating an ordered set of route events for navigating a route from a first location to an end location.

24. The first device of claim 23, wherein the first alert includes a visual indicator of a first route event of the ordered set of route events and a haptic output associated with the first route event of the ordered set of route events.

25. The first device of claim 23, wherein presenting the second alert includes initiating playback of an audio alert based on a first route event of the ordered set of route events.

26. The first device of claim 15, wherein the predetermined delay time period is between one and three seconds.

27. The first device of claim 15, wherein:
   in accordance with the event condition being of a first type, the first alert includes a first haptic output; and
   in accordance with the event condition being of a second type, the first alert includes a second haptic output that is different from the first haptic output.

28. The first device of claim 15, wherein presentations of the first alert and the second alert do not overlap in time.

29. A method, comprising:
   at a first device:
   receiving, from a second device, a request to initiate navigation based on one or more user inputs received at the second device;
   based on the request to initiate navigation, monitoring for the occurrence of event conditions related to the navigation;
   while monitoring for the occurrence of event conditions related to the navigation, determining that an event condition related to the navigation has been met, wherein the event condition corresponds to a respective suggested action;
   in response to determining that the event condition has been met:
      transmitting, to a second device, instructions to present a first alert at the second device at a first time indicating that the event condition has been met that serves as a prompt to perform the respective suggested action; and
      presenting, at the first device at a second time, a second alert indicating that the event condition has been met that also serves as a prompt to perform the same suggested action; and
   wherein:
      the second device is different from the first device,
      the second alert is different from the first alert, and
      the second time is selected so as to be spaced apart from the first time by at least a predetermined delay time period.

30. The method of claim 29, wherein determining that the event condition has been met includes determining that a route event in an ordered set of route events for navigating a route from a first location to an end location is upcoming.

31. The method of claim 29, wherein the second time is selected so as to be at least the predetermined delay time period after the first time.

32. The method of claim 29, wherein the first device is a portable computing device and the second device is a wearable computing device.

33. The method of claim 29, wherein the first alert is of a first type and the second alert is of a second type that is different from the first type, the first type and the second type selected from the group consisting of haptic, audio, and visual.

34. The method of claim 29, wherein the second alert includes an audio component without a haptic component and the first alert includes a haptic component.

35. The method of claim 29, wherein the predetermined delay time period is based on the event condition.

36. The method of claim 29, wherein the first alert includes a first haptic output that is different from a second haptic output included in the second alert.

37. The method of claim 29, further comprising:
   in response to receiving the request to initiate navigation, calculating an ordered set of route events for navigating a route from a first location to an end location.

38. The method of claim 37, wherein the first alert includes a visual indicator of a first route event of the ordered set of route events and a haptic output associated with the first route event of the ordered set of route events.

39. The method of claim 37, wherein presenting the second alert includes initiating playback of an audio alert based on a first route event of the ordered set of route events.

40. The method of claim 29, wherein the predetermined delay time period is between one and three seconds.

41. The method of claim 29, wherein:
   in accordance with the event condition being of a first type, the first alert includes a first haptic output; and
   in accordance with the event condition being of a second type, the first alert includes a second haptic output that is different from the first haptic output.

42. The method of claim 29, wherein presentations of the first alert and the second alert do not overlap in time.

* * * * *

UNITED STATES PATENT AND TRADEMARK OFFICE
CERTIFICATE OF CORRECTION

| | |
|---|---|
| PATENT NO. | : 9,574,896 B2 |
| APPLICATION NO. | : 14/864011 |
| DATED | : February 21, 2017 |
| INVENTOR(S) | : Christine McGavran et al. |

It is certified that error appears in the above-identified patent and that said Letters Patent is hereby corrected as shown below:

On the Title Page

Under Inventors, "Jefferey" should be changed to --Jeffrey--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*